(12) United States Patent
Majima et al.

(10) Patent No.: US 11,340,376 B2
(45) Date of Patent: May 24, 2022

(54) SUBSEA STRUCTURE DETECTION DEVICE, SUBSEA STRUCTURE DETECTION SYSTEM, AND SUBSEA STRUCTURE DETECTION METHOD

(71) Applicant: Shimadzu Corporation, Kyoto (JP)

(72) Inventors: Yatsuse Majima, Kyoto (JP); Naoto Mishina, Kyoto (JP); Yuki Ebara, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 56 days.

(21) Appl. No.: 16/749,669

(22) Filed: Jan. 22, 2020

(65) Prior Publication Data

US 2020/0241162 A1 Jul. 30, 2020

(30) Foreign Application Priority Data

Jan. 25, 2019 (JP) .............................. JP2019-011424

(51) Int. Cl.
*G01V 3/165* (2006.01)
(52) U.S. Cl.
CPC .................................... *G01V 3/165* (2013.01)
(58) Field of Classification Search
CPC ........ G01V 3/104; G01V 3/105; G01V 3/107; G01V 3/12; G01V 3/15; G01V 3/165
See application file for complete search history.

(56) References Cited

U.S. PATENT DOCUMENTS

| 2,531,088 | A | * | 11/1950 | Thompson | G01V 3/02 |
| | | | | | 324/365 |
| 3,875,497 | A | * | 4/1975 | Madsen | G01V 3/081 |
| | | | | | 324/326 |
| 4,078,510 | A | * | 3/1978 | Morgan | G01R 31/58 |
| | | | | | 114/144 A |
| 4,617,518 | A | * | 10/1986 | Srnka | G01V 3/12 |
| | | | | | 324/365 |
| 5,126,654 | A | * | 6/1992 | Murphy | G01N 17/02 |
| | | | | | 204/196.06 |
| 2008/0122444 | A1 | * | 5/2008 | Schaug-Pettersen | G01V 3/12 |
| | | | | | 324/335 |
| 2013/0148468 | A1 | * | 6/2013 | Juhasz | G01V 3/083 |
| | | | | | 367/20 |
| 2013/0162256 | A1 | * | 6/2013 | Hobbs | G01V 3/083 |
| | | | | | 324/334 |
| 2018/0210106 | A1 | * | 7/2018 | Kasaya | G01V 3/38 |
| 2019/0204465 | A1 | * | 7/2019 | Kasaya | G01V 3/10 |

FOREIGN PATENT DOCUMENTS

JP S62-148877 A 7/1987
JP 4144851 B2 6/2008

\* cited by examiner

*Primary Examiner* — Jermele M Hollington
*Assistant Examiner* — Suresh K Rajaputra
(74) *Attorney, Agent, or Firm* — Muir Patent Law, PLLC

(57) ABSTRACT

A subsea structure detection device includes a plurality of supply electrode pairs each including a positive electrode and a negative electrode, a plurality of potential difference detectors each arranged between the positive electrode and the negative electrode and configured to detect a potential difference between the positive electrode and the negative electrode due to a supplied current, and a controller configured to perform control to determine a position of a structure based on changes in detection signals detected by the plurality of potential difference detectors caused by the structure.

20 Claims, 14 Drawing Sheets

FIRST EMBODIMENT

FIRST EMBODIMENT

FIRST EMBODIMENT

FIRST EMBODIMENT

FIRST EMBODIMENT

FIRST EMBODIMENT

FIRST EMBODIMENT

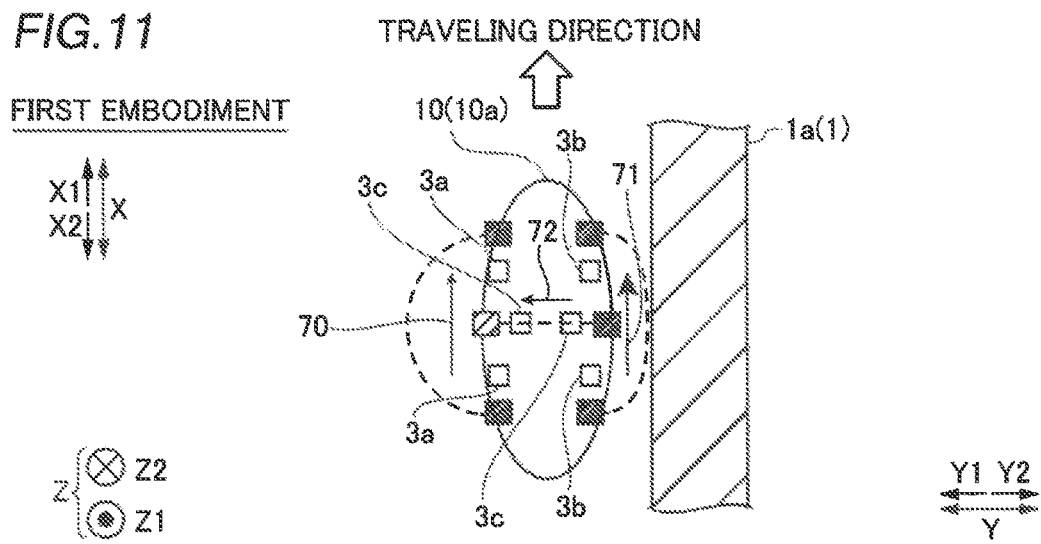
FIG.11 FIRST EMBODIMENT
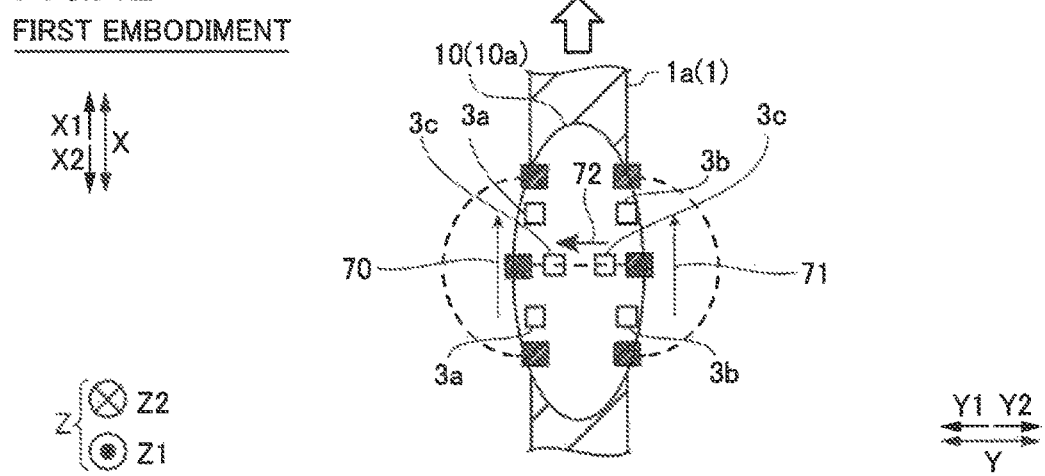
FIG.12 FIRST EMBODIMENT
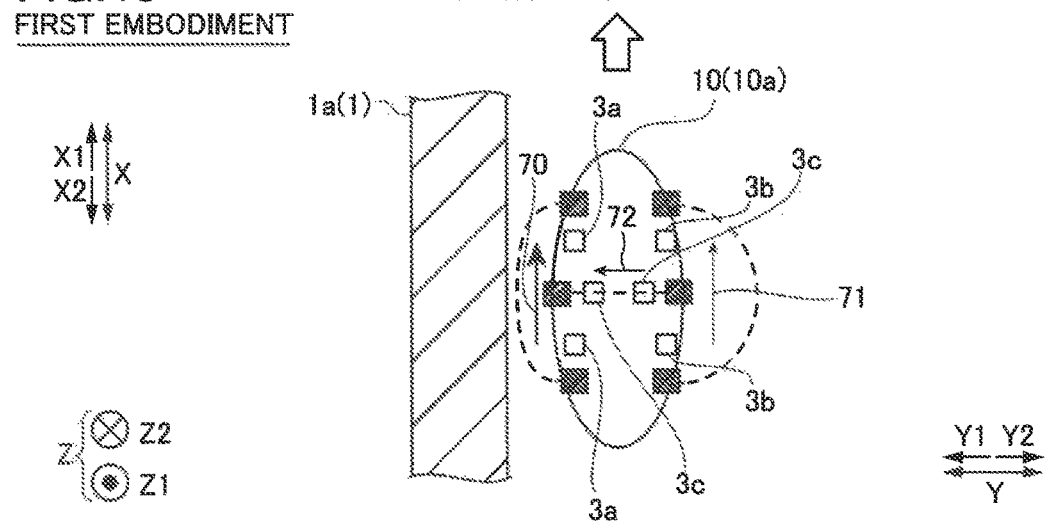
FIG.13 FIRST EMBODIMENT

FIRST EMBODIMENT

FIRST EMBODIMENT

SECOND EMBODIMENT

MODIFIED EXAMPLE OF FIRST EMBODIMENT

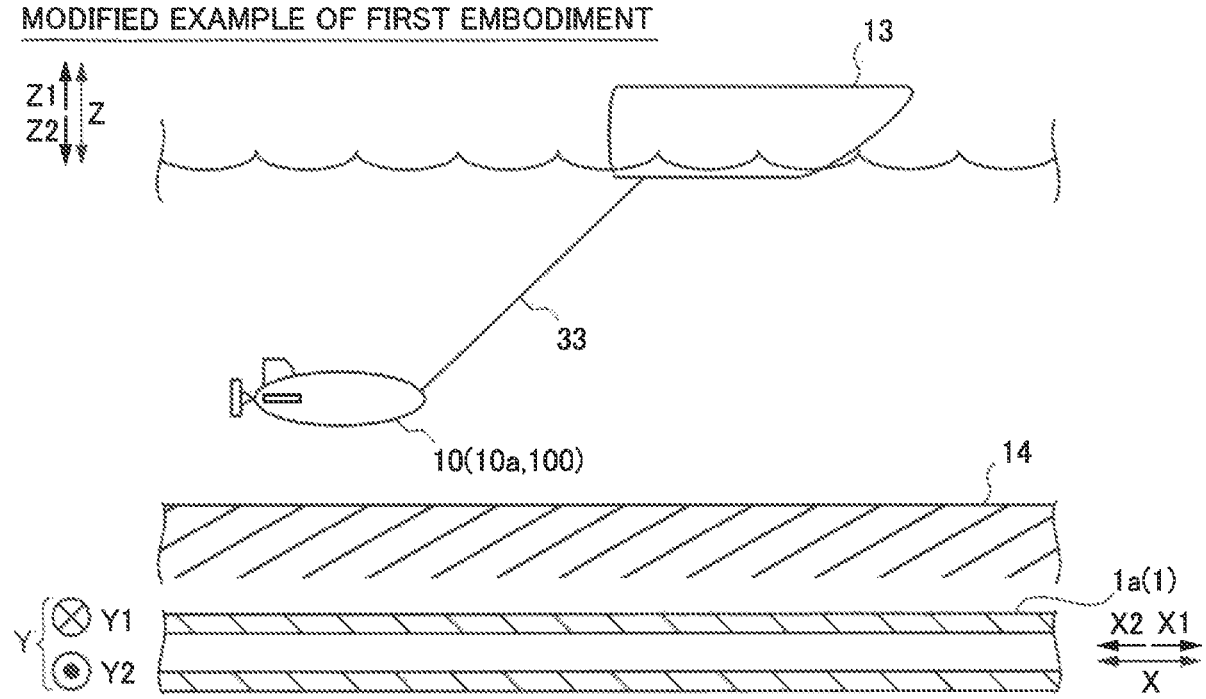

SUBSEA STRUCTURE DETECTION DEVICE, SUBSEA STRUCTURE DETECTION SYSTEM, AND SUBSEA STRUCTURE DETECTION METHOD

CROSS-REFERENCE TO RELATED APPLICATIONS

This application claims the benefit of priority to Japanese Patent Application No. 2019-011424 filed on Jan. 25, 2019. The entire contents of this application are hereby incorporated herein by reference.

BACKGROUND OF THE INVENTION

Field of the Invention

The present invention relates to a subsea structure detection device, a subsea structure detection system, and a subsea structure detection method, and more particularly, it relates to a subsea structure detection device, a subsea structure detection system, and a subsea structure detection method each for detecting a structure provided on the seabed while moving along the seabed.

Description of the Background Art

Conventionally, a subsea structure detection device, a subsea structure detection system, and a subsea structure detection method each for detecting a structure provided on the seabed while moving along the seabed are known. Such a subsea structure detection device is disclosed in Japanese Patent Laid-Open No. 62-148877, for example.

Japanese Patent Laid-Open No. 62-148877 discloses a magnetic exploratory device (subsea structure detection device) configured to detect, using magnetism, a structure provided on the seabed while moving along the seabed. The magnetic exploratory device disclosed in Japanese Patent Laid-Open No. 62-148877 includes a set sensor in which magnetic sensors are combined in two or more stages. In the magnetic exploratory device disclosed in Japanese Patent Laid-Open No. 62-148877, at least one pair of set sensors face each other in parallel on the same plane, and the magnetic exploratory device is towed by a survey ship and detects magnetism emitted from a submarine pipeline buried in the seabed so as to detect the submarine pipeline. Although not disclosed in Japanese Patent Laid-Open No. 62-148877, the submarine pipeline conceivably includes a steel pipe (iron), and a corrosion protection layer for preventing rust conceivably covers the outer peripheral surface of the steel pipe. Alternatively, the pipeline is conceivably made of a rust-resistant material such as stainless steel to prevent rust. Furthermore, although not disclosed in Japanese Patent Laid-Open No. 62-148877, the configuration of Japanese Patent Laid-Open No. 62-148877 detects the magnetism emitted from the submarine pipeline, and thus unlike visual detection of the submarine pipeline using a camera, for example, the configuration of Japanese Patent Laid-Open No. 62-148877 can conceivably detect the submarine pipeline even when the submarine pipeline is buried in sand, for example.

However, the configuration disclosed in Japanese Patent Laid-Open No. 62-148877 detects the magnetism emitted from the submarine pipeline, and thus when the magnitude of the magnetism emitted from the submarine pipeline is small due to a material for the submarine pipeline, such as when the submarine pipeline includes the corrosion protection layer or when the submarine pipeline is made of stainless steel, it is difficult to detect the position of the submarine pipeline.

SUMMARY OF THE INVENTION

The present invention is intended to solve the above problem. The present invention aims to provide a subsea structure detection device, a subsea structure detection system, and a subsea structure detection method each for detecting the position of a structure provided on the seabed even when the magnitude of magnetism emitted from the structure provided on the seabed is small due to a material for the structure provided on the seabed.

In order to attain the aforementioned object, a subsea structure detection device according to a first aspect of the present invention is configured to detect a structure provided on a seabed, and includes a plurality of supply electrode pairs each including a positive electrode and a negative electrode, a plurality of potential difference detectors each arranged between the positive electrode and the negative electrode and configured to detect a potential difference in a detection region between the positive electrode and the negative electrode due to a current supplied between the positive electrode and the negative electrode, and a controller configured to perform control to determine a position of the structure based on changes in detection signals detected by the plurality of potential difference detectors caused by the structure.

In the subsea structure detection device according to the first aspect of the present invention, as described above, the subsea structure detection device includes the controller configured to perform control to determine the position of the structure based on the changes in the detection signals detected by the plurality of potential difference detectors caused by the structure. Accordingly, it is possible to detect changes in potential difference when paths of currents supplied to the supply electrode pairs are changed by the structure, and determine the position of the structure based on the changes in the detection signals. Consequently, unlike the configuration in which the position is determined based on magnetism emitted from the structure provided on the seabed, the position of the structure provided on the seabed can be detected even when the magnitude of the magnetism emitted from the structure provided on the seabed is small due to a material for the structure provided on the seabed. Moreover, the seawater is contained in the ground of the seabed, and thus a current flows in the ground of the seabed into which the seawater permeates. Therefore, even when the structure is buried in the sand of the seabed or the like, the detection signals are changed by the structure, and thus the position of the structure can be determined. Consequently, unlike visual detection using a camera or the like, the structure can be detected even when the structure is buried in the sand of the seabed or the like.

The aforementioned subsea structure detection device according to the first aspect preferably further includes a moving body including at least the plurality of supply electrode pairs and the plurality of potential difference detectors and configured to be movable in water, and the controller is preferably configured to perform control to output a signal to adjust a moving direction of the moving body based on a determination result of the position of the structure and the detection signals. Accordingly, the moving direction of the moving body can be easily adjusted based on the signal for adjusting the moving direction. Consequently, it is possible to easily significantly reduce or prevent the structure from being outside the detectable range. Note that the term "movable in water" includes that the moving body travels autonomously and that the moving body moves by being towed by a marine vessel or the like.

In this case, the plurality of potential difference detectors each preferably include a detection electrode pair spaced apart from each other in a direction along a traveling direction of the moving body in the moving body, and are preferably configured to detect a potential difference between the detection electrode pair, and the controller is preferably configured to perform control to determine the position of the structure based on a change in the potential difference between the detection electrode pair. Accordingly, the detection electrode pair is spaced apart from each other in the direction along the traveling direction such that the potential difference between the detection electrode pair can be accurately acquired as compared with the configuration in which the potential difference is detected by one electrode. Consequently, the change in the potential difference between the detection electrode pair can be accurately acquired.

In the aforementioned configuration in which control to determine the position of the structure is performed based on the change in the potential difference between the detection electrode pair, the plurality of potential difference detectors preferably include at least a first potential difference detector provided on a first side among left-right sides of the moving body in a direction along the traveling direction, and a second potential difference detector provided on a second side different from the first side among the left-right sides, and the controller is preferably configured to perform control to determine the position of the structure in a left-right direction with respect to the traveling direction of the moving body based on a first detection signal detected by the first potential difference detector and a second detection signal detected by the second potential difference detector. Accordingly, the magnitude of the first detection signal is compared with the magnitude of the second detection signal such that the position of the structure with respect to the moving body can be determined. Consequently, as compared with the configuration in which only one pair of potential difference detectors are provided at a bottom of the moving body, the position of the structure in the left-right direction with respect to the traveling direction of the moving body can be accurately determined.

In this case, the plurality of supply electrode pairs preferably include a first electrode pair spaced apart from each other in the direction along the traveling direction on the first side and a second electrode pair spaced apart from each other in the direction along the traveling direction on the second side, and currents of different frequencies are preferably respectively supplied to the first electrode pair and the second electrode pair. Accordingly, the frequencies of the currents respectively supplied to the electrode pairs are different, and thus the currents can be supplied to the electrode pairs at the same timing. Consequently, the detection time can be reduced as compared with the case in which currents having the same frequency are supplied to the electrode pairs at different timings.

In the aforementioned configuration in which the currents of different frequencies are supplied to the first electrode pair and the second electrode pair, the controller is preferably configured to perform control to determine the position of the structure with respect to the moving body by Fourier transforming the detection signals and analyzing a Fourier transformed detection signal for each of the frequencies of the currents respectively supplied to the first electrode pair and the second electrode pair. Accordingly, even when the currents of different frequencies are supplied to the electrode pairs at the same timing, the Fourier transformed detection signal is analyzed at each current frequency such that each detection signal can be analyzed individually. Consequently, the detection result in each potential difference detector can be accurately analyzed.

In the aforementioned configuration in which control to determine the position of the structure in the left-right direction with respect to the traveling direction of the moving body is performed based on the first detection signal and the second detection signal, the plurality of potential difference detectors preferably further include a third potential difference detector including the detection electrode pair aligned in the left-right direction with respect to the traveling direction in the moving body. Accordingly, the third potential difference detector can improve the determination accuracy when the subsea structure detection device is directly above the structure. Consequently, the accuracy of determining the position of the structure can be improved.

In the aforementioned configuration in which control to determine the position of the structure in the left-right direction with respect to the traveling direction of the moving body is performed based on the first detection signal and the second detection signal, the plurality of potential difference detectors are preferably provided at a side or a bottom side of the moving body in such a manner that distances in an upward-downward direction from a bottom of the moving body are substantially equal to each other. Accordingly, the distances from the respective potential difference detectors to the structure provided on the seabed can be substantially equal to each other. Therefore, it is possible to significantly reduce or prevent a variation in the magnitudes of the detection signals due to a difference between the distances from the potential difference detectors to the structure. Consequently, it is possible to significantly reduce or prevent the influence depending on the distances from the potential difference detectors to the structure, and the accuracy of determining the position of the structure can be further improved.

In the aforementioned configuration in which control is performed to output the signal to adjust the moving direction of the moving body based on the determination result of the position of the structure and the detection signals, the moving body preferably includes the plurality of supply electrode pairs, the plurality of potential difference detectors, a current source configured to supply a current between the plurality of supply electrode pairs, the controller, and a propulsion mechanism configured to apply a propulsive force to the moving body, and is preferably configured to autonomously travel in a sea. Accordingly, the position of the structure can be detected while the moving body is autonomously traveling in the sea.

In the aforementioned subsea structure detection device according to the first aspect, the structure is preferably a pipeline provided on the seabed, and the controller is preferably configured to determine a position of the pipeline. Accordingly, it is possible to provide the subsea structure detection device suitable for determining the position of the pipeline.

A subsea structure detection system according to a second aspect of the present invention is configured to detect a structure provided on a seabed, and includes a detection device including a plurality of supply electrode pairs each including a positive electrode and a negative electrode and a plurality of potential difference detectors each arranged between the positive electrode and the negative electrode and configured to detect a potential difference in a detection region between the positive electrode and the negative electrode due to a current supplied between the positive electrode and the negative electrode, a current source configured to supply a current between the plurality of supply electrode pairs, and a control device configured to perform control to determine a position of the structure based on changes in detection signals detected by the plurality of potential difference detectors caused by the structure.

As described above, the subsea structure detection system according to the second aspect of the present invention includes the control device configured to perform control to determine the position of the structure based on the changes in the detection signals detected by the plurality of potential difference detectors caused by the structure. Accordingly, similarly to the subsea structure detection device according to the first aspect, it is possible to provide the subsea structure detection system configured to be able to detect the position of the structure provided on the seabed even when the magnitude of the magnetism emitted from the structure provided on the seabed is small due to a material for the structure provided on the seabed.

In the aforementioned subsea structure detection system according to the second aspect, the control device is preferably provided in a marine vessel configured to travel on a sea surface. Accordingly, in the control device provided in the marine vessel, determination of the position of the structure can be performed, and thus the configuration of the detection device can be simplified.

A subsea structure detection method according to a third aspect of the present invention is for detecting a structure provided on a seabed, and includes moving, along the seabed, a moving body including at least a supply electrode pair including a positive electrode and a negative electrode and a potential difference detector, supplying a current between the positive electrode and the negative electrode, detecting a potential difference in a detection region between the positive electrode and the negative electrode, and performing control to determine a position of the structure based on a change in a detected detection signal caused by the structure.

In the subsea structure detection method according to the third aspect of the present invention, as described above, control to determine the position of the structure based on the change in the detected detection signal caused by the structure is performed. Accordingly, similarly to the subsea structure detection device according to the first aspect, it is possible to provide the subsea structure detection method capable of detecting the position of the structure provided on the seabed even when the magnitude of the magnetism emitted from the structure provided on the seabed is small due to a material for the structure provided on the seabed.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 11 is a schematic view in the case in which the subsea structure detection device is located on the left side of the pipeline.

FIG. 12 is a schematic view in the case in which the subsea structure detection device is located directly above the pipeline.

FIG. 13 is a schematic view in the case in which the subsea structure detection device is located on the right side of the pipeline.

FIG. 21 is a schematic view showing the subsea structure detection device according to the modified example of the first embodiment that is detecting a pipeline provided on the seabed.

DESCRIPTION OF THE PREFERRED EMBODIMENTS

Embodiments of the present invention are hereinafter described with reference to the drawings.

First Embodiment

The configuration of a subsea structure detection device 100 according to a first embodiment is now described with reference to FIGS. 1 to 15.

(Configuration of Subsea Structure Detection Device)

First, the configuration of the subsea structure detection device 100 according to the first embodiment is described with reference to FIG. 1.

Figure 2:
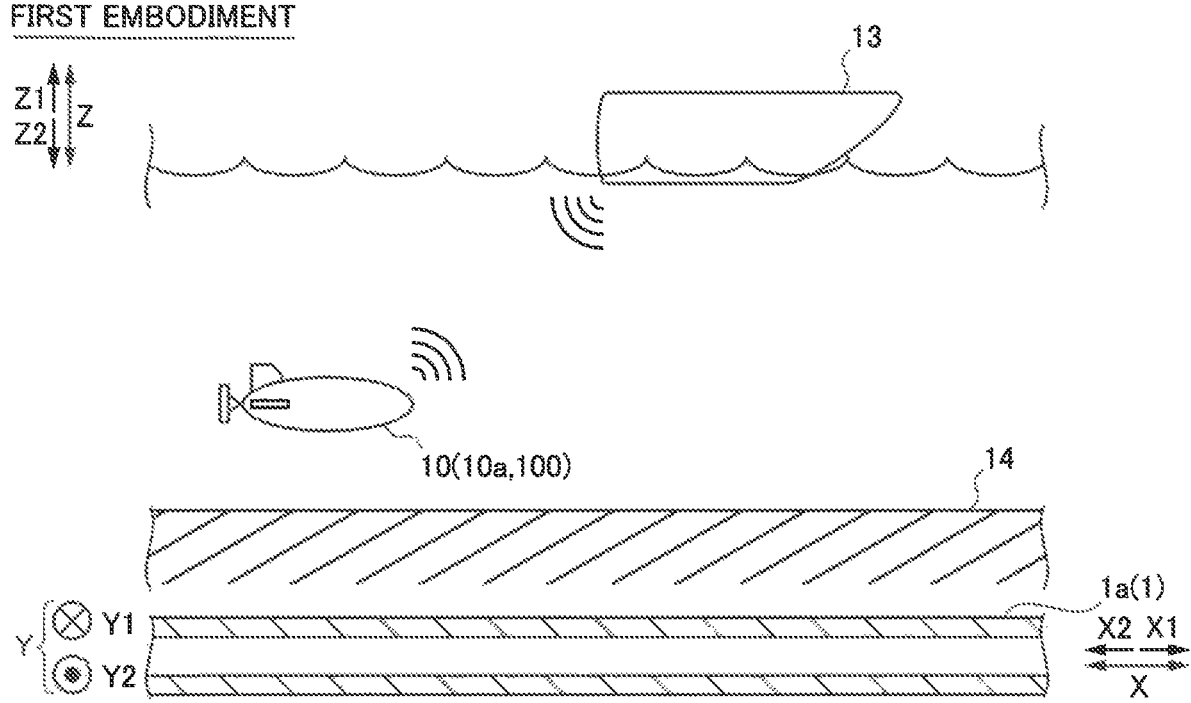
FIG. 2 is a schematic view showing the subsea structure detection device according to the first embodiment that is detecting a pipeline provided on the seabed.

The subsea structure detection device 100 is configured to detect a structure 1 (see FIG. 2) provided on the seabed 14 (see FIG. 2). Specifically, the subsea structure detection device 100 is configured to detect a pipeline 1a provided on the seabed 14. The pipeline 1a includes a steel pipe, a stainless steel pipe, or the like having an outer peripheral surface covered with a corrosion protection layer (not shown) for preventing rust, for example. The corrosion protection layer includes an insulator such as rubber or polyvinyl chloride, for example. When the corrosion protection layer is provided on the pipeline 1a, no current flows through the pipeline 1a. Furthermore, even when the pipeline 1a is made of a rust-resistant material such as stainless steel and no corrosion protection layer is provided, a current does not easily flow through the pipeline 1a due to a difference in electrical resistance between the seawater and the pipeline 1a. The pipeline 1a is an example of a "structure" in the claims.

Figure 1:
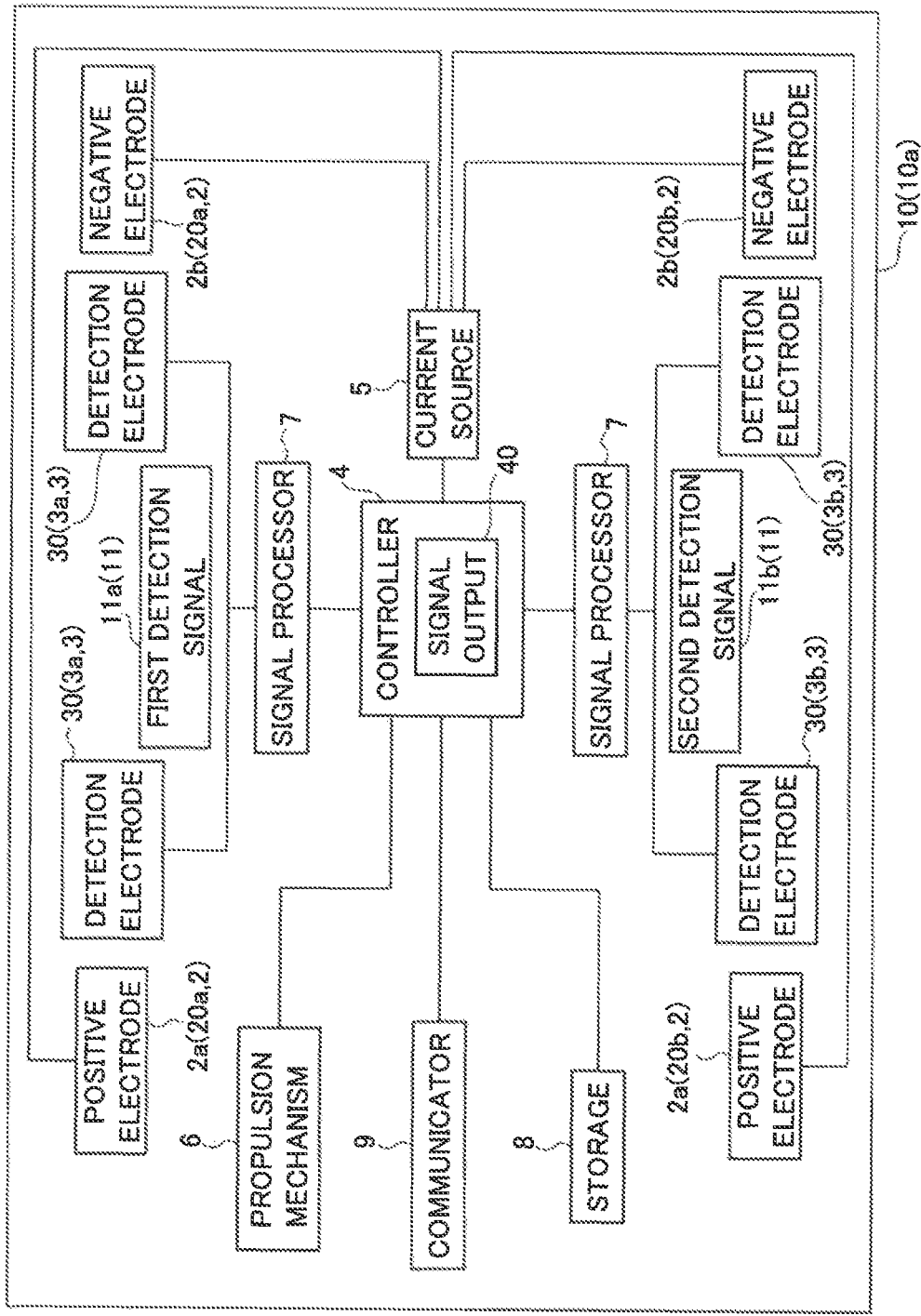
FIG. 1 is a block diagram showing the overall configuration of a subsea structure detection device according to a first embodiment.

As shown in FIG. 1, the subsea structure detection device 100 includes a plurality of supply electrode pairs 2, a plurality of potential difference detectors 3, a controller 4, a current source 5, a propulsion mechanism 6, a signal processor 7, a storage 8, and a communicator 9. In the first embodiment, the subsea structure detection device 100 includes a moving body 10 including at least the supply electrode pairs 2 and the potential difference detectors 3 and configured to be able to move in water. In this specification, the traveling direction of the subsea structure detection device 100 is defined as an X1 direction, and the opposite direction is defined as an X2 direction. Furthermore, a left-right direction with respect to the traveling direction is defined as a Y direction, a left direction is defined as a Y1 direction, and a right direction is defined as a Y2 direction. An upward-downward direction with respect to the traveling direction is defined as a Z direction, an upward direction is defined as a Z1 direction, and a downward direction is defined as a Z2 direction.

The supply electrode pairs 2 each include a positive electrode 2a and a negative electrode 2b. The supply electrode pairs 2 are configured to supply a current supplied from the current source 5 to the potential difference detectors 3.

The potential difference detectors 3 are each disposed between each positive electrode 2a and each negative electrode 2b, and are configured to detect a potential difference in a detection region 56 (see FIG. 6) between the positive electrode 2a and the negative electrode 2b due to a current supplied between the positive electrode 2a and the negative electrode 2b. The potential difference detectors 3 each include a silver-silver chloride electrode, for example.

The controller 4 is configured or programmed to perform control to determine the position of the pipeline 1a based on changes in detection signals 11 detected by the plurality of potential difference detectors 3 caused by the pipeline 1a. The controller 4 is configured or programmed to control the current source 5 to supply a current to the supply electrode pairs 2. The controller 4 includes a processor such as a central processing unit (CPU), a microprocessor, or a field-programmable gate array (FPGA) configured for determining the position of the pipeline 1a. The controller 4 includes a signal output 40.

The signal output 40 is configured to perform control to output a signal to adjust the moving direction of the moving body 10 based on the determination result of the position of the pipeline 1a and the detection signals 11. In the first embodiment, the controller 4 functions as the signal output 40 by executing a program stored in the storage 8.

The moving body 10 includes a housing 10a and the propulsion mechanism 6. In the housing 10a, the supply electrode pairs 2, the potential difference detectors 3, the current source 5 that supplies a current between the supply electrode pairs 2, the controller 4, and the propulsion mechanism 6 that applies a propulsive force to the moving body 10 are provided. The moving body 10 is configured to autonomously travel in the sea. Moreover, the moving body 10 is configured to be unmanned and movable in the sea. The moving body 10 is a so-called autonomous underwater vehicle (AUV).

The current source 5 is configured to supply a current to the supply electrode pairs 2 under control of the controller 4. In the first embodiment, the current source 5 is configured to supply an alternating current to the supply electrode pairs 2. The current source 5 is configured to supply a current of several tens to several hundreds of Hz as an alternating current to the supply electrode pairs 2. The current source 5 is configured to be able to supply currents of different frequencies to the supply electrode pairs 2 at the same timing. The current source 5 is configured to supply currents of frequencies different from each other by several tens of Hz as the currents of different frequencies. The current source 5 includes a power supply device capable of supplying an alternating current, for example.

The propulsion mechanism 6 is configured to apply a propulsive force to the moving body 10 under control of the controller 4. The propulsion mechanism 6 includes a propeller (not shown) and a drive source (not shown) that drives the propeller. The propulsion mechanism 6 may have a so-called screw configuration in which water is propelled by rotating a propeller to obtain a propulsive force, or may be a so-called water jet propulsion mechanism that obtains a propulsive force by ejecting a high-pressure water flow backward.

The signal processor 7 is configured to convert the detection signals 11 detected by the potential difference detectors 3 into digital signals. The signal processor 7 is configured to amplify the detection signals 11 converted into the digital signals. The signal processor 7 is configured to transmit the detection signals 11 to the controller 4. The signal processor 7 includes an analog-digital (AD) converter, an amplifier, etc., for example.

The storage 8 is configured to store a program executed by the controller 4, positional information about the pipeline 1a detected by the subsea structure detection device 100, etc. The storage 8 includes a hard disk drive (HDD), a non-volatile memory, etc., for example.

The communicator 9 is configured to communicate with a marine vessel 13 (see FIG. 2) under control of the controller 4. Specifically, the communicator 9 is configured to receive distribution information about the pipeline 1a from the marine vessel 13 and to transmit detailed positional information about the pipeline 1a to the marine vessel 13. The communicator 9 includes a transmitter-receiver that can be wirelessly connected, for example.

As shown in FIG. 2, the subsea structure detection device 100 (moving body 10) detects the pipeline 1a by traveling along the seabed 14. FIG. 2 shows an example in which the pipeline 1a provided on the seabed 14 is buried in sand or the like.

(Arrangement of Supply Electrode Pairs and Potential Difference Detectors)

Next, the arrangement of the supply electrode pairs 2 and the potential difference detectors 3 is described with reference to FIGS. 3 to 5.

Figure 3:
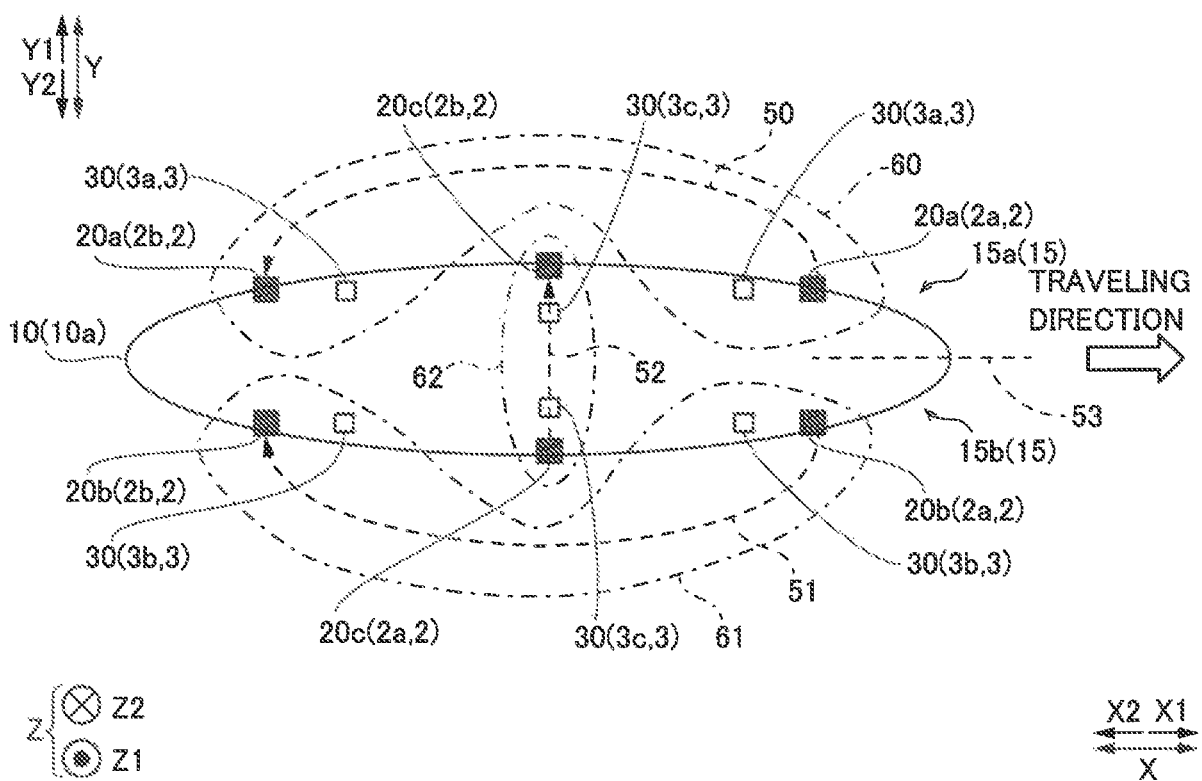
FIG. 3 is a schematic view showing the subsea structure detection device according to the first embodiment as viewed in a Z2 direction.

As shown in FIG. 3, the plurality of potential difference detectors 3 each include a detection electrode pair 30 spaced apart from each other in a direction (X direction) along the traveling direction (X1 direction) in the moving body 10. Furthermore, the potential difference detectors 3 include at least a first potential difference detector 3a provided on a first side 15a among left-right sides 15 of the moving body 10 in the direction along the traveling direction, and a second potential difference detector 3b provided on a second side 15b different from the first side 15a among the left-right sides 15. In addition, the potential difference detectors 3 include a third potential difference detector 3c including a detection electrode pair 30 aligned along the left-right direction (Y direction) with respect to the traveling direction (X1 direction) in the moving body 10. In an example shown in FIG. 3, one of the left-right sides 15 on the Y1 direction side (left side) from a straight line 53 passing through the center of the moving body 10 in the direction along the X direction is defined as the first side 15a. Furthermore, the other of the left-right sides 15 on the Y2 direction side (right side) from the straight line 53 passing through the center of the moving body 10 is defined as the second side 15b.

As shown in FIG. 3, the supply electrode pairs 2 each include a first electrode pair 20a spaced apart from each other in the X direction on the first side 15a and a second electrode pair 20b spaced apart from each other in the X direction on the second side 15b. In the first embodiment, currents of different frequencies are supplied to the first electrode pair 20a and the second electrode pair 20b. Furthermore, the supply electrode pairs 2 include a third electrode pair 20c spaced apart from each other in a direction along the Y direction at the bottom 16 side (see FIG. 5).

Figure 4:
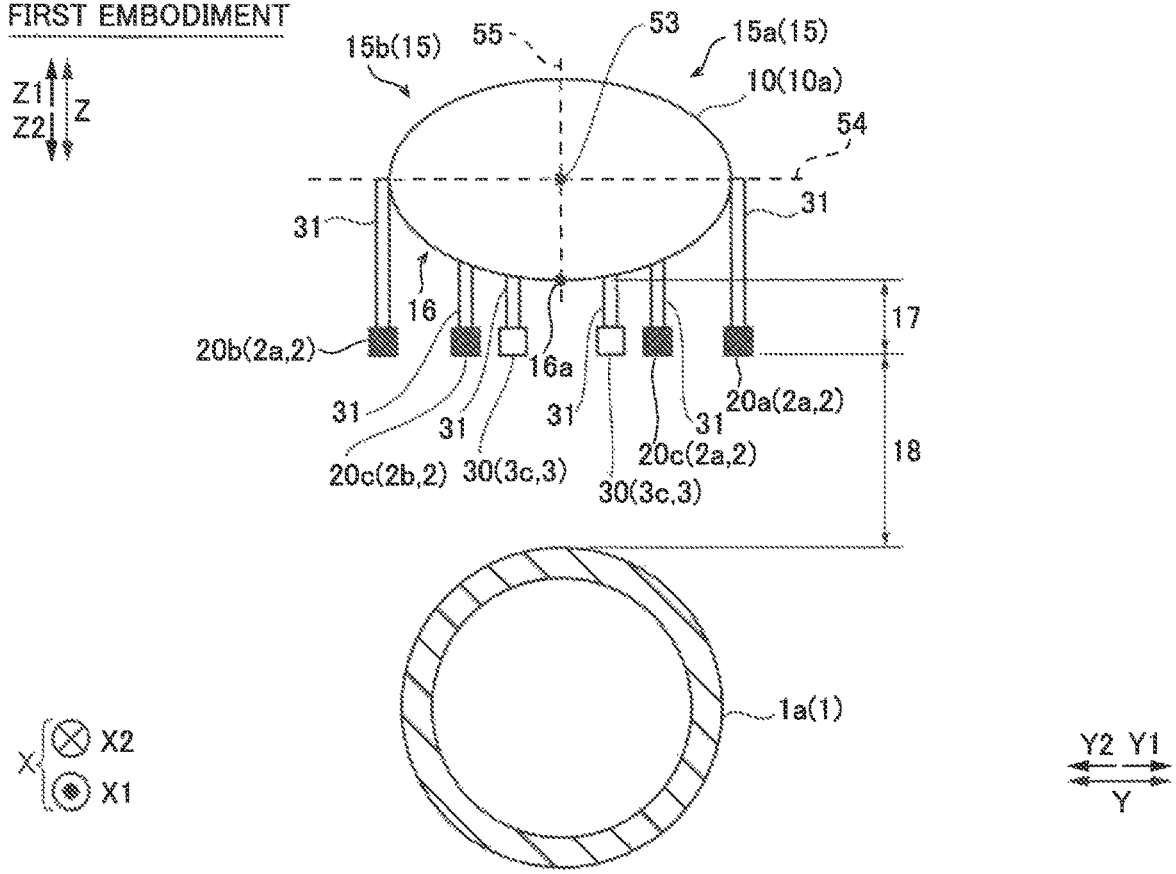
FIG. 4 is a schematic view of the subsea structure detection device according to the first embodiment as viewed in an X2 direction.
Figure 5:
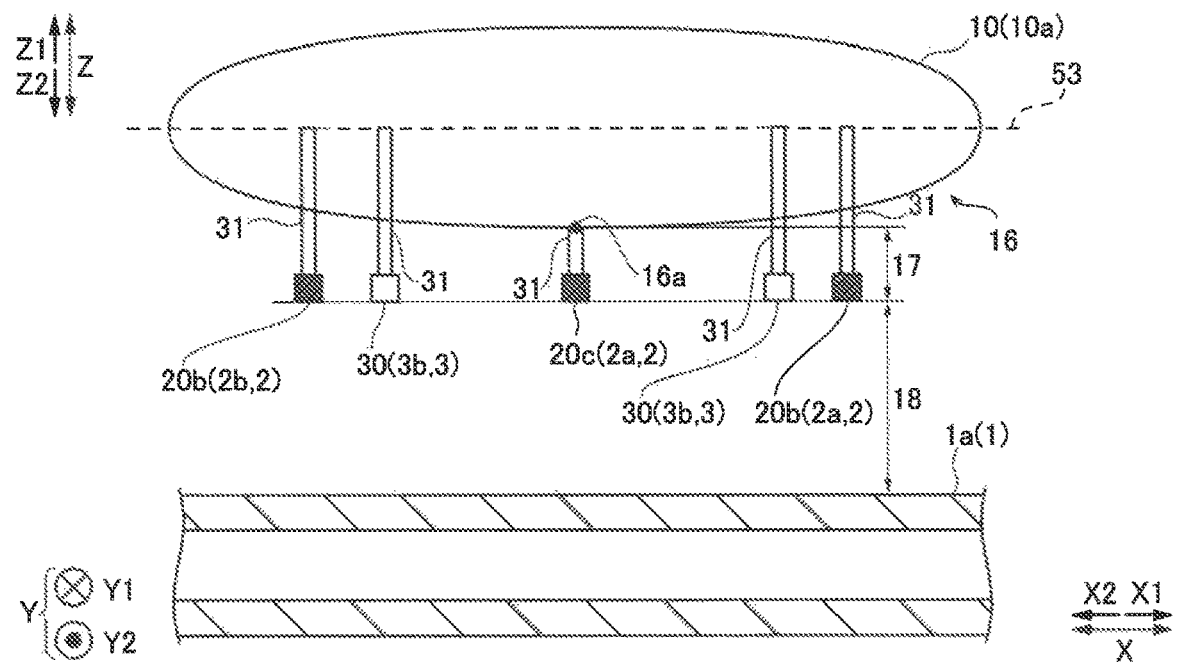
FIG. 5 is a schematic view of the subsea structure detection device according to the first embodiment as viewed in a Y1 direction.

As shown in FIGS. 4 and 5, the plurality of potential difference detectors 3 are provided at the sides 15 or the bottom 16 side of the moving body 10 in such a manner that distances 17 in the upward-downward direction from the bottom 16 of the moving body 10 are substantially equal to each other. Furthermore, the plurality of supply electrode pairs 2 are provided at the sides 15 or the bottom 16 side of the moving body 10 in such a manner that the distances 17 in the upward-downward direction from the bottom 16 of the moving body 10 are substantially equal to each other. In other words, the plurality of potential difference detectors 3 and the plurality of supply electrode pairs 2 are provided at the sides 15 or the bottom 16 side of the moving body 10 in such a manner that distances 18 in the upward-downward direction from the plurality of potential difference detectors 3 and the plurality of supply electrode pairs 2 to the pipeline 1a are substantially equal to each other.

Note that the distances 17 in the upward-downward direction from the bottom 16 of the moving body 10 are distances in the upward-downward direction from a lowermost portion 16a of the bottom 16. FIG. 4 is a view seen in the X2 direction, and thus the straight line 53 is shown by a dot. In an example shown in FIG. 4, the bottom 16 is on the Z2 direction side (lower side) with respect to the straight line 53. In FIG. 4, for the sake of simplicity, a broken line 54 that passes through the center of the moving body 10 and extends along the Y direction and a broken line 55 that passes through the center of the moving body 10 and extends along the Z direction are illustrated. That is, the bottom 16 is on the Z2 direction side (lower side) with respect to the broken line 54. The first side 15a is on the Y1 direction side with respect to the broken line 55, and the second side 15b is on the Y2 direction side with respect to the broken line 55. In an example shown in FIG. 5, the bottom 16 is on the Z2 direction side (lower side) with respect to the straight line 53. In addition, the plurality of supply electrode pairs 2 and the plurality of potential difference detectors 3 are provided on the moving body 10 via support members 31. The support members 31 may have any shape, material, and structure as long as the same can support the plurality of supply electrode pairs 2 and the plurality of potential difference detectors 3.

(Detection of Potential Difference)

The potential difference detectors 3 are each configured to detect a potential difference between the detection electrode pair 30. Specifically, the potential difference detectors 3 are each configured to detect the potential difference in the detection region 56 between the detection electrode pair 30 by acquiring a difference between a value of a reference potential and a detection value detected by one of the detection electrode pair 30, using a detection value detected by the other of the detection electrode pair 30 as the reference potential. That is, in the first embodiment, a detection unit including a supply electrode pair 2 and the detection electrode pair 30 is configured to detect the potential difference in the detection region 56 between the detection electrode pair 30. In the first embodiment, the moving body 10 includes three detection units.

As shown in FIG. 3, when a current is supplied to the positive electrode 2a of the first electrode pair 20a, the current flows from the positive electrode 2a to the negative electrode 2b along an arrow 50. At this time, an electric field is generated in a region 60 indicated by a one-dot chain line. The first potential difference detector 3a detects a potential difference in the region 60 in which the electric field is generated. In addition, when a current is supplied to the positive electrode 2a of the second electrode pair 20b, a current flows from the positive electrode 2a to the negative electrode 2b along an arrow 51. At this time, an electric field is generated in a region 61 indicated by a one-dot chain line. The second potential difference detector 3b detects a potential difference in the region 61 in which the electric field is generated. Furthermore, when a current is supplied to the positive electrode 2a of the third electrode pair 20c, a current flows from the positive electrode 2a to the negative electrode 2b along an arrow 52. At this time, an electric field is generated in a region 62 indicated by a one-dot chain line. The third potential difference detector 3c detects a potential difference in the region 62 in which the electric field is generated.

In the first embodiment, the controller 4 is configured or programmed to perform control to determine the position of the pipeline 1a based on a change in the potential difference between the detection electrode pair 30. Specifically, the controller 4 is configured or programmed to perform control to determine the position of the pipeline 1a in the Y direction based on a first detection signal 11a (see FIG. 1) detected by the first potential difference detector 3a and a second detection signal 11b (see FIG. 1) detected by the second potential difference detector 3b.

(Change in Detection Signal)

Figure 6:
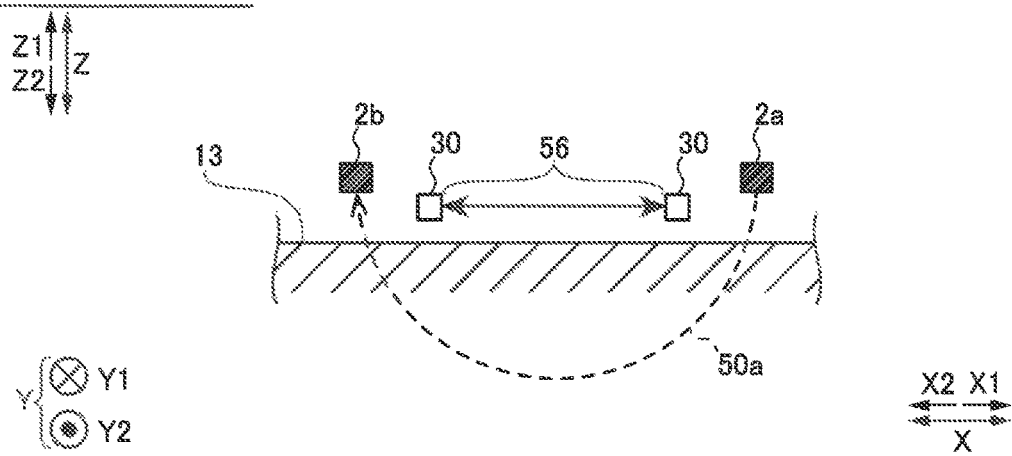
FIG. 6 is a schematic view for illustrating current flow without the pipeline.
Figure 7:
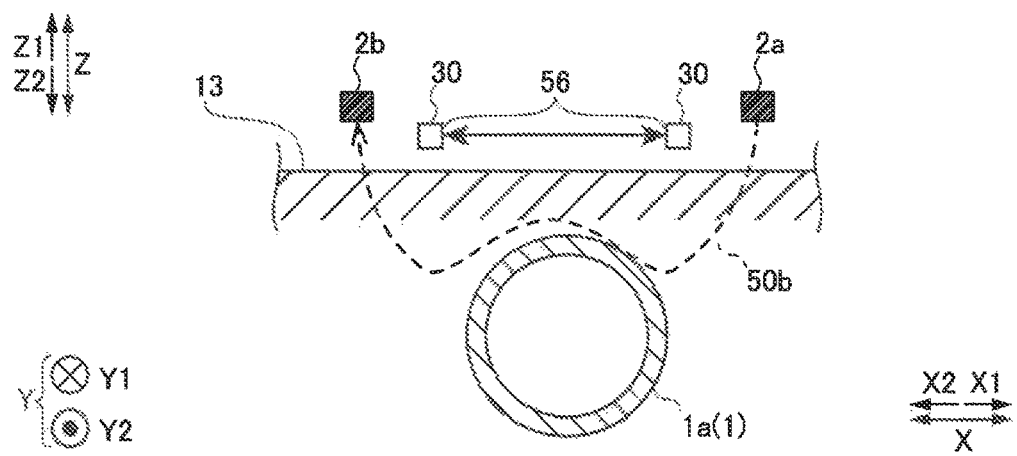
FIG. 7 is a schematic view for illustrating current flow in the case in which a supply electrode pair and potential difference detectors are located in a direction that intersects with the pipeline.
Figure 8:
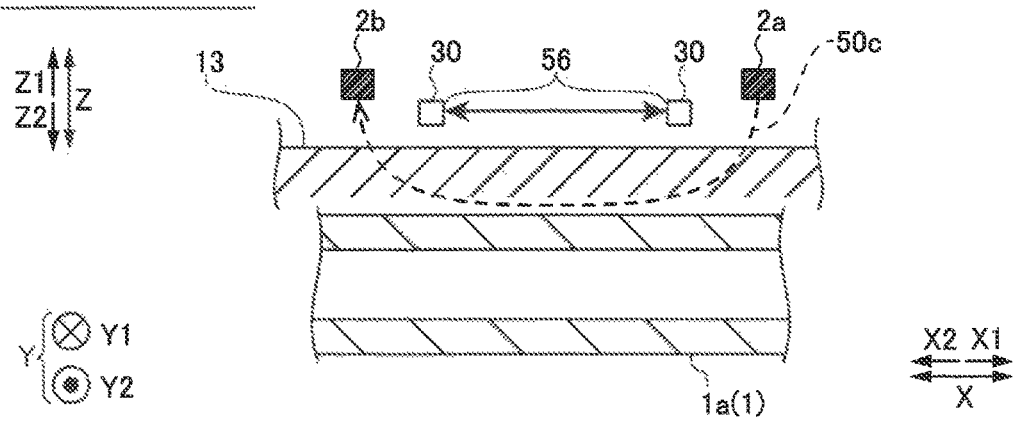
FIG. 8 is a schematic view for illustrating current flow in the case in which the supply electrode pair and the potential difference detectors are located in a direction along the pipeline.

Next, a change in a detection signal 11 detected by the subsea structure detection device 100 caused by the pipeline 1a is described with reference to FIGS. 6 to 8. FIGS. 6 to 8 show examples in which the detection signal 11 is detected by the first electrode pair 20a and the first potential difference detector 3a. Detection of the detection signal 11 by the second electrode pair 20b and the second potential difference detector 3b and detection of the detection signal 11 by the third electrode pair 20c and the third potential difference detector 3c are performed by the same configuration.

As shown in FIG. 6, when there is no pipeline 1a in the vicinity of the moving body 10, a current flowing on the outermost side among currents flowing between the supply electrode pair 2 arcuately flows from the positive electrode 2a to the negative electrode 2b, as shown by a broken line 50a. The first potential difference detector 3a detects a potential difference in the detection region 56 between the detection electrode pair 30 in the region 60.

As shown in FIG. 7, when the supply electrode pair 2 and the first potential difference detector 3a are at a position that intersects with the pipeline 1a, a current supplied between the supply electrode pair 2 flows in such a manner as to avoid the pipeline 1a. Therefore, a path of a current flowing on the outermost side changes, as shown by a broken line 50b, as compared with the broken line 50a shown in FIG. 6. In this case, the density of an electric line of force in the region 60 (see FIG. 3) increases, and thus a potential difference in the detection region 56 between the detection electrode pair 30 is larger than the potential difference in the detection region 56 between the detection electrode pair 30 detected in the case of the arrangement in FIG. 6. That is, a value of the detection signal 11 detected by the first potential difference detector 3a increases.

As shown in FIG. 8, when the supply electrode pair 2 and the first potential difference detector 3a are located in a direction along the pipeline 1a, a current supplied from the supply electrode pair 2 flows along the pipeline 1a. Therefore, a path of a current flowing on the outermost side among currents flowing between the supply electrode pair 2 changes, as shown by a broken line 50c, as compared with the broken line 50a shown in FIG. 6.

Also in this case, the density of an electric line of force in the region 60 (see FIG. 3) increases, and thus a potential difference in the detection region 56 between the detection electrode pair 30 is larger than the potential difference in the detection region 56 between the detection electrode pair 30 detected in the case of the arrangement in FIG. 6. That is, a value of the detection signal 11 detected by the first potential difference detector 3a increases.

(Analysis of Detection Signal)

Next, the configuration of the controller 4 to analyze the detection signal 11 is described with reference to FIGS. 9 and 10.

Figure 9:
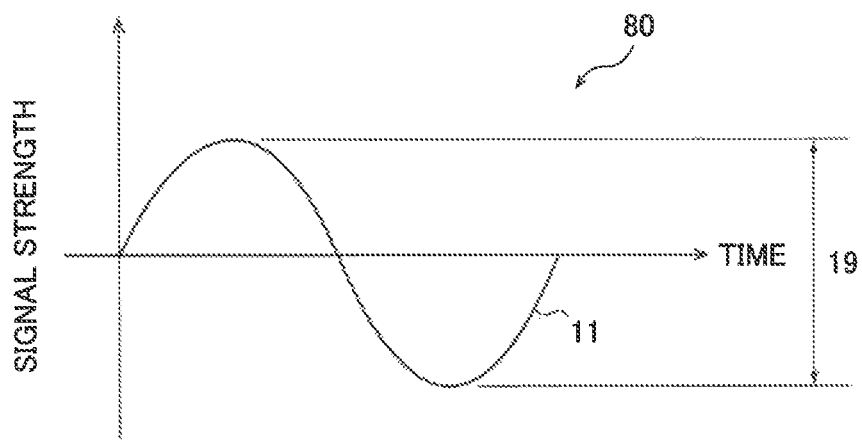
FIG. 9 is a graph showing the waveform of a detection signal detected by the potential difference detector.
Figure 10:
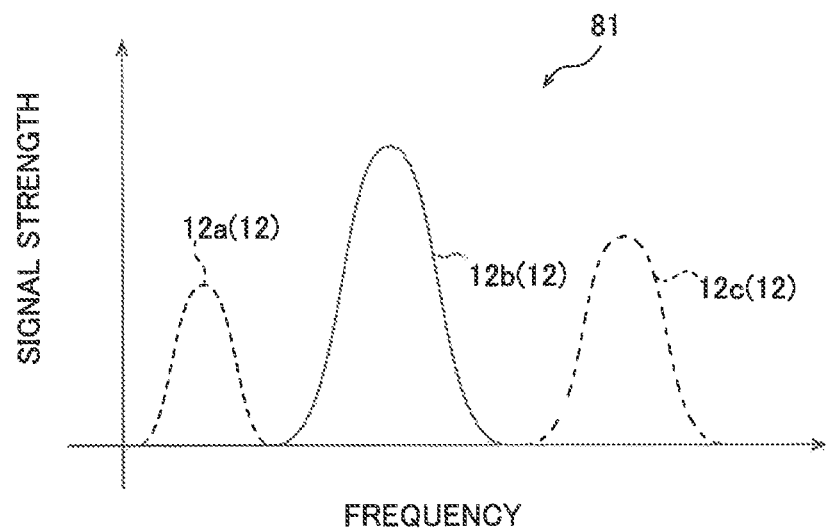
FIG. 10 is a graph showing the waveform of a Fourier transformed detection signal.

The waveform of the alternating current supplied to the supply electrode pair 2 has a sinusoidal shape, and thus the shape of the waveform of the detection signal 11 detected by the potential difference detector 3 is the same as that of a sine wave, as shown in a graph 80 shown in FIG. 9. In the graph 80, the vertical axis represents signal strength, and the horizontal axis represents time. The signal strength in the graph 80 refers to the magnitude of the amplitude 19 of the detection signal 11. When the pipeline 1a exists in the vicinity of the moving body 10, the detection signal 11 becomes large. That is, the amplitude 19 of the detection signal 11 in the graph 80 increases.

In the first embodiment, the controller 4 is configured to analyze the detection signal 11 by Fourier transforming the detection signal 11. Specifically, the controller 4 acquires a Fourier transformed detection signal 12 shown by a graph 81 in FIG. 10 by Fourier transforming the detection signal 11. In the graph 81, the vertical axis represents signal strength, and the horizontal axis represents frequencies.

In the first embodiment, the controller 4 is configured to perform control to determine the position of the pipeline 1a with respect to the moving body 1 by analyzing the Fourier transformed detection signal 12 for each of the frequencies of the currents supplied to the first electrode pair 20a and the second electrode pair 20b. Furthermore, in the first embodiment, the third electrode pair 20c is provided, and thus the controller 4 analyzes the Fourier transformed detection signal 12 for each of the frequencies of the currents supplied to the first electrode pair 20a, the second electrode pair 20b, and the third electrode pair 20c. In the graph 81 shown in FIG. 10, a detection signal 12a is a detection signal 12 obtained by Fourier transforming the detection signal 11 detected by the first potential difference detector 3a. A detection signal 12b is a detection signal 12 obtained by Fourier transforming the detection signal 11 detected by the second potential difference detector 3b. A detection signal 12c is a detection signal 12 obtained by Fourier transforming the detection signal 11 detected by the third potential difference detector 3c.

(Determination of Pipeline Position)

Next, a configuration of the subsea structure detection device 100 to determine the position of the pipeline 1a is described with reference to FIGS. 11 to 13. In examples shown in FIGS. 11 to 13, the detection signals 11 of the first potential difference detector 3a, the second potential difference detector 3b, and the third potential difference detector 3c are respectively represented by an arrow 70, an arrow 71, and an arrows 72, and differences between the magnitudes of the values of the detection signals 11 are illustrated by changing the thickness of each arrow. That is, as the signal strength of the detection signal 11 is larger, the arrow is thicker.

As shown in FIG. 11, when the subsea structure detection device 100 is located on the left side of the pipeline 1a, the value of the detection signal 11 of the second potential difference detector 3b is larger than the values of the detection signals 11 of the other potential difference detectors 3. That is, when the value of the detection signal 11 of the second potential difference detector 3b is larger than the values of the detection signals 11 of the other potential difference detectors 3, the controller 4 determines that the subsea structure detection device 100 is located on the left side of the pipeline 1a. In other words, when the value of the detection signal 11 of the second potential difference detector 3b is larger than the values of the detection signals 11 of the other potential difference detectors 3, the controller 4 determines that the pipeline 1a is located on the right side of the subsea structure detection device 100.

As shown in FIG. 12, when the subsea structure detection device 100 is located directly above the pipeline 1a, the value of the detection signal 11 of the third potential difference detector 3c is larger than the values of the detection signals 11 of the other potential difference detectors 3. That is, when the value of the detection signal 11 of the third potential difference detector 3c is larger than the values of the detection signals 11 of the other potential difference detectors 3, the controller 4 determines that the subsea structure detection device 100 is located directly above the pipeline 1a. In other words, when the value of the detection signal 11 of the third potential difference detector 3c is larger than the values of the detection signals 11 of the other potential difference detectors 3, the controller 4 determines that the pipeline 1a is located directly below the subsea structure detection device 100.

As shown in FIG. 13, when the subsea structure detection device 100 is located on the right side of the pipeline 1a, the value of the detection signal 11 of the first potential difference detector 3a is larger than the values of the detection signals 11 of the other potential difference detectors 3. That is, when the value of the detection signal 11 of the first potential difference detector 3a is larger than the values of the detection signals 11 of the other potential difference detectors 3, the controller 4 determines that the subsea structure detection device 100 is located on the right side of the pipeline 1a. In other words, when the value of the detection signal 11 of the first potential difference detector 3a is larger than the values of the detection signals 11 of the other potential difference detectors 3, the controller 4 determines that the pipeline 1a is located on the left side of the subsea structure detection device 100.

(Adjustment of Moving Direction of Moving Body)

Next, a configuration to adjust the moving direction of the moving body 10 is described with reference to FIGS. 14 and 15.

Figure 14:
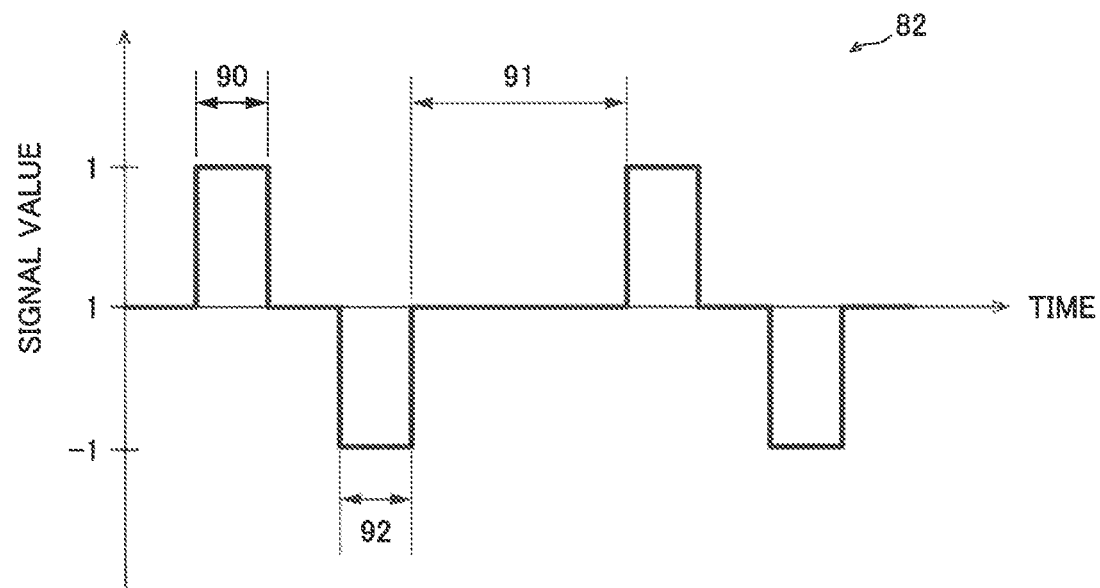
FIG. 14 is a graph showing the waveform of a signal for adjusting the moving direction of a moving body.

A graph 82 shown in FIG. 14 is a graph of a signal for adjusting the moving direction of the moving body 10 output by the signal output 40. In the graph 82, the vertical axis represents signal values, and the horizontal axis represents time. A section 90 in which the value of the graph 82 is "1" is a section in which a signal for moving the moving body 10 in the right direction is output. Furthermore, a section 91 in which the value of the graph 82 is "0" is a section in which a signal for moving the moving body 10 without any change (without changing the moving direction) is output. Furthermore, a section 92 in which the value of the graph 82 is "−1" is a section in which a signal for moving the moving body 10 in the left direction is output.

When the pipeline 1a is on the right side of the moving body 10 (see FIG. 11), the signal output 40 outputs "1" as a signal for adjusting the moving direction of the moving body 10. When the pipeline 1a is directly below the moving body 10 (see FIG. 12), the signal output 40 outputs "0" as a signal for adjusting the moving direction of the moving body 10. When the pipeline 1a is on the left side of the moving body 10 (see FIG. 13), the signal output 40 outputs "−1" as a signal for adjusting the moving direction of the moving body 10.

The controller 4 adjusts the moving direction of the moving body 10 by controlling the propulsion mechanism 6 based on a signal for adjusting the moving direction of the moving body 10 output from the signal output 40. Specifically, when receiving a signal "1" from the signal processor 7, the controller 4 performs control to move the moving body 10 in the right direction. When receiving a signal "0" from the signal processor 7, the controller 4 does not perform control to adjust the moving direction of the moving body 10. When receiving a signal "−1" from the signal processor 7, the controller 4 performs control to move the moving body 10 in the left direction.

Figure 15:
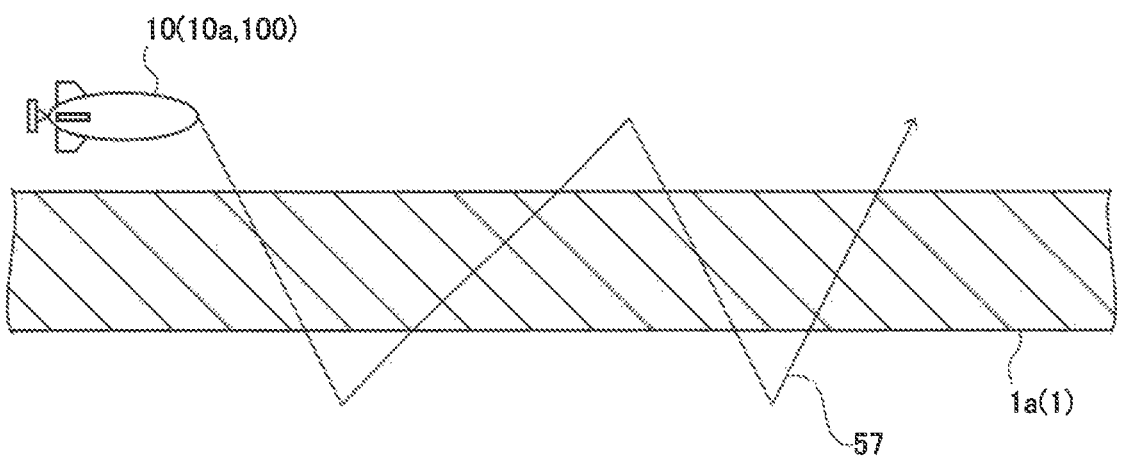
FIG. 15 is a schematic view showing movement of the subsea structure detection device based on the signal for adjusting the moving direction of the moving body.

When a signal for adjusting the moving direction of the moving body 10 as shown in the graph 82 of FIG. 14 is output, the controller 4 adjusts the moving direction of the moving body 10, as shown in FIG. 15. That is, the controller 4 adjusts the moving direction such that the moving body 10 moves in a zigzag manner above the pipeline 1a, as indicated by an arrow 57 shown in FIG. 15.

(Moving Direction Adjustment Signal Output Processing)

Figure 16:
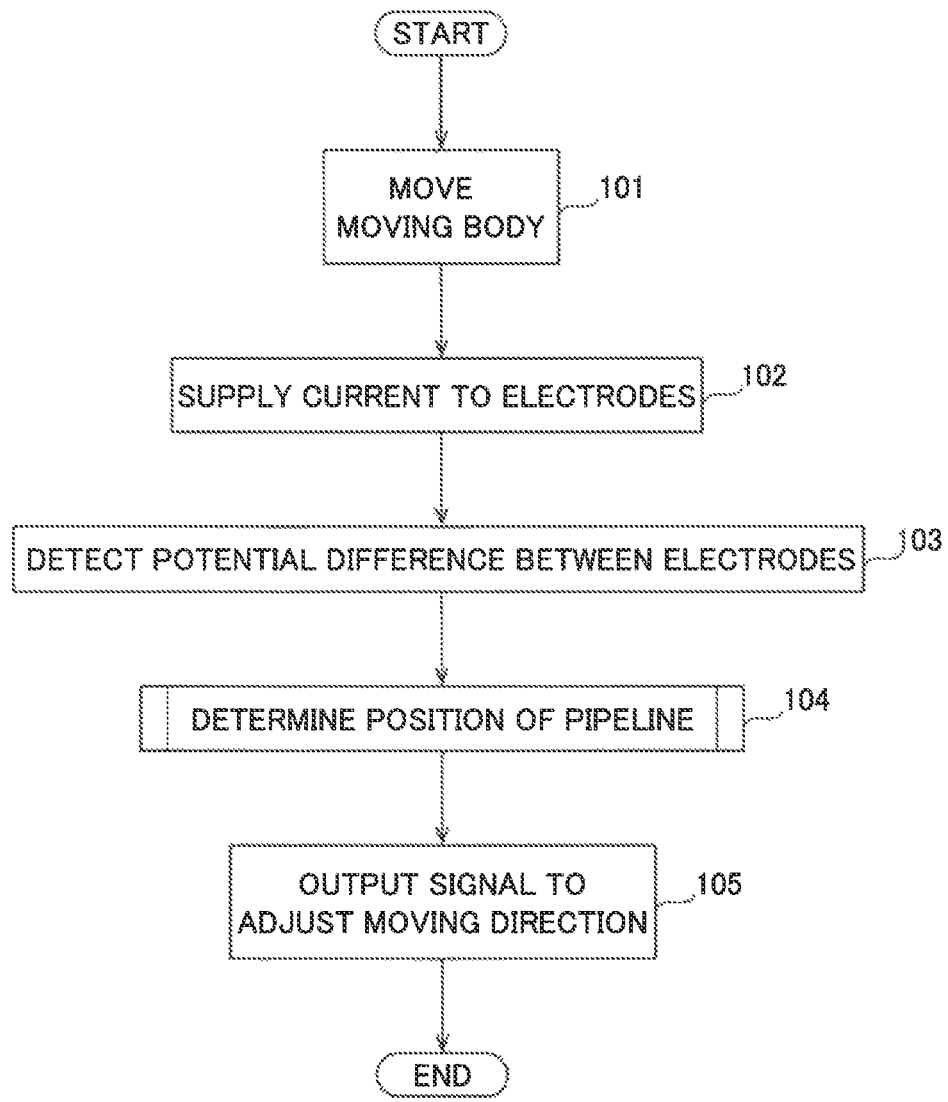
FIG. 16 is a flowchart for illustrating moving direction adjustment signal output processing performed by the subsea structure detection device according to the first embodiment.

Next, moving direction adjustment signal output processing performed by the subsea structure detection device 100 according to the first embodiment is described based on a flowchart with reference to FIG. 16. The moving direction adjustment signal output processing is performed by the controller 4 (signal output 40).

In step 101, the controller 4 controls the propulsion mechanism 6 to move the moving body 10. Specifically, the controller 4 controls the propulsion mechanism 6 to move the moving body 10 including the supply electrode pairs 2 each including the positive electrode 2a and the negative electrode 2b and the potential difference detectors 3 along the seabed 14. Note that moving the moving body 10 means continuing to move the moving body 10 in order to detect the pipeline 1a.

Next, in step 102, the controller 4 controls the current source 5 to supply a current to each of the supply electrode pairs 2. Specifically, the controller 4 controls the current source 5 to supply a current between the positive electrode 2a and the negative electrode 2b.

Next, in step 103, the potential difference detectors 3 each detect a potential difference between the supply electrode pair 2. Specifically, the potential difference detectors 3 each detect a potential difference in the detection region 56 between the positive electrode 2a and the negative electrode 2b.

Next, in step 104, the controller 4 performs control to determine the position of the pipeline 1a based on a change in the detected detection signal 11 caused by the pipeline 1a.

Next, in step 105, the signal output 40 outputs a signal to adjust the moving direction of the moving body 10 and terminates the processing.

(Pipeline Position Determination Processing)

Figure 17:
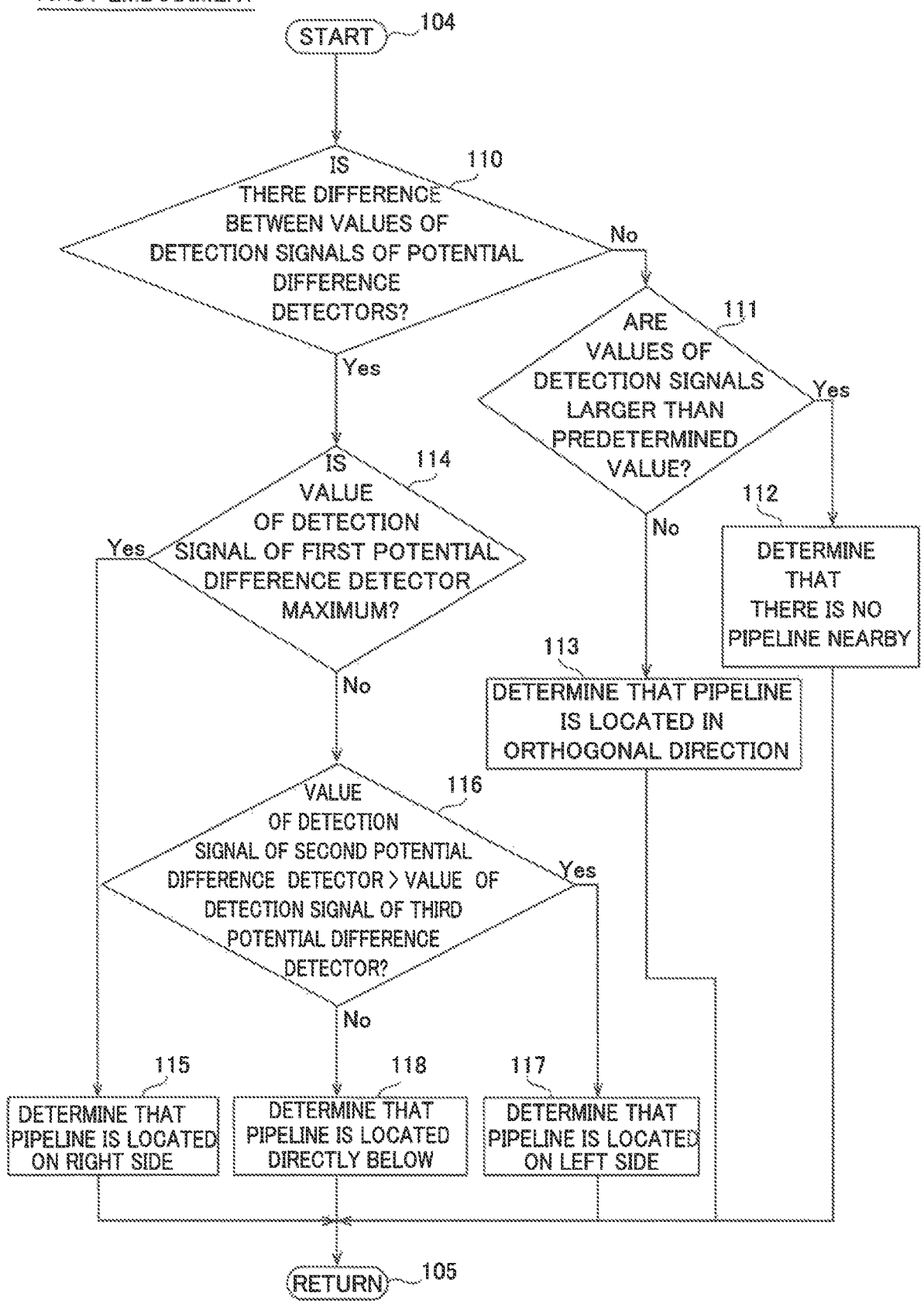
FIG. 17 is a flowchart for illustrating pipeline position determination processing performed by the subsea structure detection device according to the first embodiment.

Next, pipeline position determination processing performed by the subsea structure detection device 100 according to the first embodiment is described based on a flowchart with reference to FIG. 17. The pipeline position determination processing is performed by the controller 4.

In step 110, the controller 4 determines whether or not there is a difference between the values of the detection signals 11 of the potential difference detectors 3. When there is no difference between the values of the detection signals 11 of the potential difference detectors 3, the processing advances to step 111. When there is a difference between the values of the detection signals 11 of the potential difference detectors, the processing advances to step 114.

In step 111, the controller 4 determines whether or not the values of the detection signals 11 of the potential difference detectors 3 are larger than a predetermined value. When the values of the detection signals 11 of the potential difference detectors 3 are larger than the predetermined value, the processing advances to step 112. When the values of the detection signals 11 of the potential difference detectors 3 are smaller than the predetermined value, the processing advances to step 113.

In step 112, the controller 4 determines that there is no pipeline 1a in the vicinity of the moving body 10. Thereafter, the processing advances to step 105, and the pipeline position determination processing is terminated.

In step 113, the controller 4 determines that the pipeline 1a is located in a direction orthogonal to the moving body 10. Thereafter, the processing advances to step 105, and the pipeline position determination processing is terminated.

In step 114, the controller 4 determines whether or not the value of the detection signal 11 of the first potential difference detector 3a is the largest. When the value of the detection signal 11 of the first potential difference detector 3a is the largest, the processing advances to step 115. When there is the detection signal 11 having a value larger than the value of the detection signal 11 of the first potential difference detector 3a, the processing advances to step 116.

In step 115, the controller 4 determines that the pipeline 1a is located on the right side of the moving body 10.

Thereafter, the processing advances to step 105, and the pipeline position determination processing is terminated.

In step 116, the controller 4 determines whether or not the value of the detection signal 11 of the second potential difference detector 3b is larger than the value of the detection signal 11 of the third potential difference detector 3c. When the value of the detection signal 11 of the second potential difference detector 3b is larger than the value of the detection signal 11 of the third potential difference detector 3c, the processing advances to step 117. When the value of the detection signal 11 of the second potential difference detector 3b is smaller than the value of the detection signal 11 of the third potential difference detector 3c, the processing advances to step 118.

In step 117, the controller 4 determines that the pipeline 1a is located on the left side of the moving body 10. Thereafter, the processing advances to step 105, and the pipeline position determination processing is terminated.

In step 118, the controller 4 determines that the pipeline 1a is located directly below the moving body 10. Thereafter, the processing advances to step 105, and the pipeline position determination processing is terminated.

Advantages of First Embodiment

According to the first embodiment, the following advantages are obtained.

According to the first embodiment, as described above, the subsea structure detection device 100 detects the pipeline 1a (structure 1) provided on the seabed 14, and includes the plurality of supply electrode pairs 2 each including the positive electrode 2a and the negative electrode 2b, the plurality of potential difference detectors 3 each arranged between the positive electrode 2a and the negative electrode 2b and configured to detect the potential difference in the detection region 56 between the positive electrode 2a and the negative electrode 2b due to the current supplied between the positive electrode 2a and the negative electrode 2b, and the controller 4 configured to perform control to determine the position of the pipeline 1a based on changes in the detection signals 11 detected by the plurality of potential difference detectors 3 caused by the pipeline 1a. Accordingly, it is possible to detect changes in potential difference when the paths of the currents supplied to the supply electrode pairs 2 are changed by the pipeline 1a, and determine the position of the pipeline 1a provided on the seabed 14 based on the changes in the detection signals 11. Consequently, unlike the configuration in which the position is determined based on the magnetism emitted from the pipeline 1a provided on the seabed 14, the position of the pipeline 1a can be detected even when the magnitude of the magnetism emitted from the pipeline 1a provided on the seabed 14 is small due to a material for the pipeline 1a provided on the seabed 14. Moreover, the seawater is contained in the ground of the seabed 14, and thus a current flows in the ground of the seabed 14 into which the seawater permeates. Therefore, even when the pipeline 1a is buried in the sand of the seabed 14 or the like, the detection signals 11 are changed by the pipeline 1a, and thus the position of the pipeline 1a can be determined. Consequently, unlike visual detection using a camera or the like, the pipeline 1a can be detected even when the pipeline 1a is buried in the sand of the seabed 14 or the like.

According to the first embodiment, as described above, the subsea structure detection device 100 includes the moving body 10 including at least the supply electrode pairs 2 and the potential difference detectors 3 and configured to be movable in water, and the controller 4 is configured to perform control to output the signal to adjust the moving direction of the moving body 10 based on the determination result of the position of the pipeline 1a and the detection signals 11. Accordingly, the moving direction of the moving body 10 can be easily adjusted based on the signal for adjusting the moving direction. Consequently, it is possible to easily significantly reduce or prevent the pipeline 1a from being outside the detectable range.

According to the first embodiment, as described above, the potential difference detectors 3 each include the detection electrode pair 30 spaced apart from each other in the direction (X direction) along the traveling direction (X1 direction) in the moving body 10, and are configured to detect the potential difference between the detection electrode pair 30, and the controller 4 is configured to perform control to determine the position of the pipeline 1a based on the change in the potential difference between the detection electrode pair 30.

Accordingly, the detection electrode pair 30 is spaced apart from each other in the X direction such that the potential difference between the detection electrode pair 30 can be accurately acquired as compared with the configuration in which the potential difference is detected by one electrode. Consequently, the change in the potential difference between the detection electrode pair 30 can be accurately acquired.

According to the first embodiment, as described above, the plurality of potential difference detectors 3 include at least the first potential difference detector 3a provided on the first side 15a among the left-right sides 15 of the moving body 10 in the X direction, and the second potential difference detector 3b provided on the second side 15b different from the first side 15a among the left-right sides 15, and the controller 4 is configured to perform control to determine the position of the pipeline 1a in the left-right direction (Y direction) with respect to the traveling direction (X1 direction) of the moving body 10 based on the first detection signal 11a detected by the first potential difference detector 3a and the second detection signal 11b detected by the second potential difference detector 3b. Accordingly, the magnitude of the first detection signal 11a is compared with the magnitude of the second detection signal 11b such that the position of the pipeline 1a with respect to the moving body 10 can be determined. Consequently, as compared with the configuration in which only one pair of potential difference detectors 3 are provided at the bottom 16 of the moving body 10, the position of the pipeline 1a in the Y direction can be accurately determined.

According to the first embodiment, as described above, the supply electrode pairs 2 include the first electrode pair 20a spaced apart from each other in the X direction on the first side 15a and the second electrode pair 20b spaced apart from each other in the X direction on the second side 15b, and the currents of different frequencies are supplied to the first electrode pair 20a and the second electrode pair 20b. Accordingly, the frequencies of the currents supplied to the first electrode pair 20a and the second electrode pair 20b are different, and thus the currents can be supplied to the first electrode pair 20a and the second electrode pair 20b at the same timing. Consequently, the detection time can be reduced as compared with the case in which currents having the same frequency are supplied to the first electrode pair 20a and the second electrode pair 20b at different timings.

According to the first embodiment, as described above, the controller 4 is configured to perform control to determine the position of the pipeline 1a with respect to the moving body 1 by Fourier transforming the detection signals 11 and analyzing the Fourier transformed detection signal 12 for each of the frequencies of the currents supplied to the first electrode pair 20*a* and the second electrode pair 20*b*. Accordingly, even when currents having different frequencies are supplied to the first electrode pair 20*a* and the second electrode pair 20*b* at the same timing, the Fourier transformed detection signal 12 is analyzed at each current frequency such that each detection signal 11 can be analyzed individually. Consequently, the detection result in each potential difference detector 3 can be accurately analyzed.

According to the first embodiment, as described above, the potential difference detectors 3 further include the third potential difference detector 3*c* including the detection electrode pair 30 aligned in the Y direction in the moving body 10. Accordingly, the third potential difference detector 3*c* can improve the determination accuracy when the subsea structure detection device 100 is directly above the pipeline 1*a*. Consequently, the accuracy of determining the position of the pipeline 1*a* can be improved.

According to the first embodiment, as described above, the plurality of potential difference detectors 3 are provided at the sides 15 or the bottom 16 side of the moving body 10 in such a manner that the distances 17 in the upward-downward direction from the bottom 16 of the moving body 10 are substantially equal to each other. Accordingly, the distances 18 from the respective potential difference detectors 3 to the pipeline 1*a* provided on the seabed 14 can be substantially equal to each other. Therefore, it is possible to significantly reduce or prevent a variation in the magnitudes of the detection signals 11 due to a difference between the distances 18 from the potential difference detectors 3 to the pipeline 1*a*. Consequently, it is possible to significantly reduce or prevent the influence depending on the distances 18 from the potential difference detectors 3 to the pipeline 1*a*, and the accuracy of determining the position of the pipeline 1*a* can be further improved.

According to the first embodiment, as described above, the moving body 10 includes the supply electrode pairs 2, the potential difference detectors 3, the current source 5 that supplies a current between the supply electrode pair 2, the controller 4, and the propulsion mechanism 6 that applies a propulsive force to the moving body 10, and is configured to autonomously travel in the sea. Accordingly, the position of the pipeline 1*a* can be detected while the moving body 10 is autonomously traveling in the sea.

According to the first embodiment, as described above, the structure 1 is the pipeline 1*a* provided on the seabed 14, and the controller 4 is configured to determine the position of the pipeline 1*a*. Accordingly, it is possible to provide the subsea structure detection device 100 suitable for determining the position of the pipeline 1*a*.

According to the first embodiment, as described above, the subsea structure detection method is for detecting the pipeline 1*a* provided on the seabed 14, and includes moving, along the seabed 14, the moving body 10 including at least the supply electrode pairs 2 each including the positive electrode 2*a* and the negative electrode 2*b* and the potential difference detectors 3, supplying a current between the positive electrode 2*a* and the negative electrode 2*b*, detecting the potential difference in the detection region 56 between the positive electrode 2*a* and the negative electrode 2*b*, and performing control to determine the position of the pipeline 1*a* based on the changes in the detected detection signals 11 caused by the pipeline 1*a*. Accordingly, similarly to the subsea structure detection device 100, it is possible to provide the subsea structure detection method capable of detecting the position of the pipeline 1*a* provided on the seabed 14 even when the magnitude of the magnetism emitted from the pipeline 1*a* provided on the seabed 14 is small due to a material for the pipeline 1*a* provided on the seabed 14.

Second Embodiment

Figure 18:
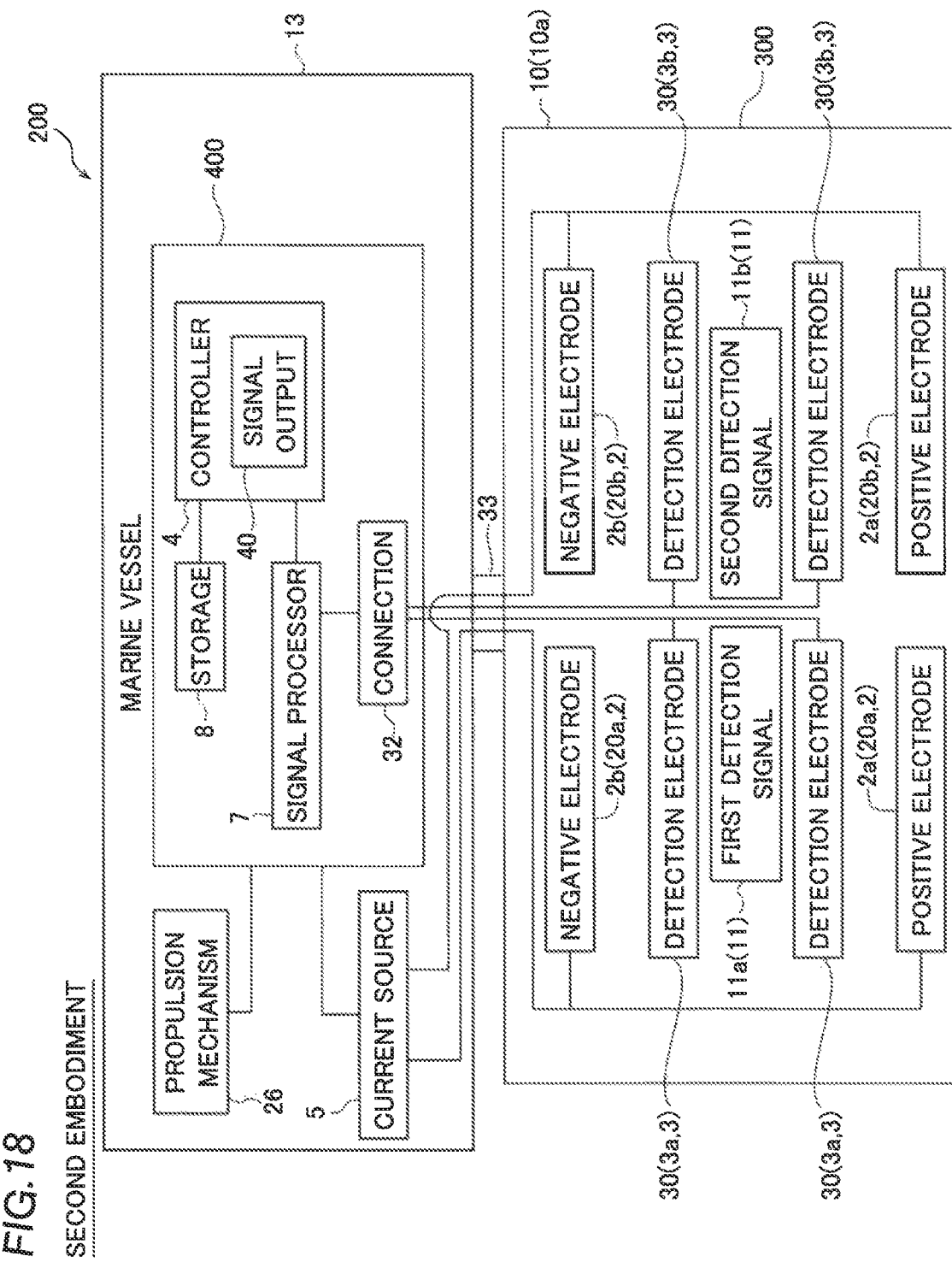
FIG. 18 is a block diagram showing the overall configuration of a subsea structure detection device according to a second embodiment.

The configuration of a subsea structure detection system 200 including a detection device 300 (see FIG. 18) according to a second embodiment is now described with reference to FIGS. 18 and 19. Unlike the first embodiment in which the subsea structure detection device 100 (moving body 10) can autonomously travel, the detection device 300 (moving body 10) provided in the subsea structure detection system 200 according to the second embodiment is towed by a marine vessel 13 and is movable in the sea. The same configurations as those of the first embodiment are denoted by the same reference numerals, and description thereof is omitted.

The subsea structure detection system 200 is configured to detect a structure 1 (pipeline 1*a*) provided on the seabed 14. As shown in FIG. 18, the subsea structure detection system 200 according to the second embodiment includes a current source 5, a detection device 300, and a control device 400. Moreover, the moving body 10 and the marine vessel 13 are directly connected to each other by a cable 33.

The current source 5 is configured to supply a current to supply electrode pairs 2 provided in the detection device 300. The current source 5 has the same configuration as that of the current source 5 according to the first embodiment, and thus detailed description thereof is omitted.

The cable 33 connects the current source 5 and the control device 400 to the detection device 300. The cable 33 is configured to supply a current from the current source 5 to the detection device 300. The cable 33 is configured to communicate detection signals 11 etc. between the detection device 300 and the control device 400. The cable 33 includes a towing cable that directly connects the moving body 10 to the marine vessel 13, a power cable that supplies a current from the current source 5 to the detection device 300, and a communication cable for communicating between the detection device 300 and the control device 400, etc., for example.

The detection device 300 includes a plurality of supply electrode pairs 2 each including a positive electrode 2*a* and a negative electrode 2*b*, and a plurality of potential difference detectors 3 each arranged between each positive electrode 2*a* and each negative electrode 2*b* and configured to detect a potential difference in a detection region 56 between the positive electrode 2*a* and the negative electrode 2*b* due to a current supplied between the positive electrode 2*a* and the negative electrode 2*b*. The configurations of the plurality of supply electrode pairs 2 and the plurality of potential difference detectors 3 are the same as those in the first embodiment, and thus detailed description thereof is omitted.

The control device 400 includes a controller 4, a signal processor 7, a storage 8, and a connection 32. The controller 4 of the control device 400, the signal processor 7, and the storage 8 are respectively the same as those of the controller 4, the signal processor 7, and the storage 8 included in the subsea structure detection device 100 according to the first embodiment, and thus detailed description thereof is omitted.

The control device 400 is configured to perform control to determine the position of the pipeline 1*a* based on changes in the detection signals 11 detected by the plurality of potential difference detectors 3 caused by the pipeline 1a. Control of the control device 400 to determine the position of the pipeline 1a is the same as control of the controller 4 according to the first embodiment to determine the position of the pipeline 1a, and thus detailed description thereof is omitted.

The connection 32 is configured to communicate the detection signals 11 etc. between the detection device 300 and the control device 400 when the cable 33 is connected. The connection 32 includes a local area network (LAN) port to which the communication cable can be connected, for example.

The current source 5 and the control device 400 are provided in the marine vessel 13 that travels on the sea surface. The marine vessel 13 includes a propulsion mechanism 26. The propulsion mechanism 26 is configured to apply a propulsive force to the marine vessel 13. The propulsion mechanism 26 includes a propeller (not shown), a drive source (not shown) that drives the propeller, etc. Furthermore, the propulsion mechanism 26 is configured to adjust the moving direction of the moving body 10 by adjusting the moving direction of the marine vessel 13 based on a signal for adjusting the moving direction of the moving body 10 output from the control device 400 (signal output 40) under control of the control device 400.

Figure 19:
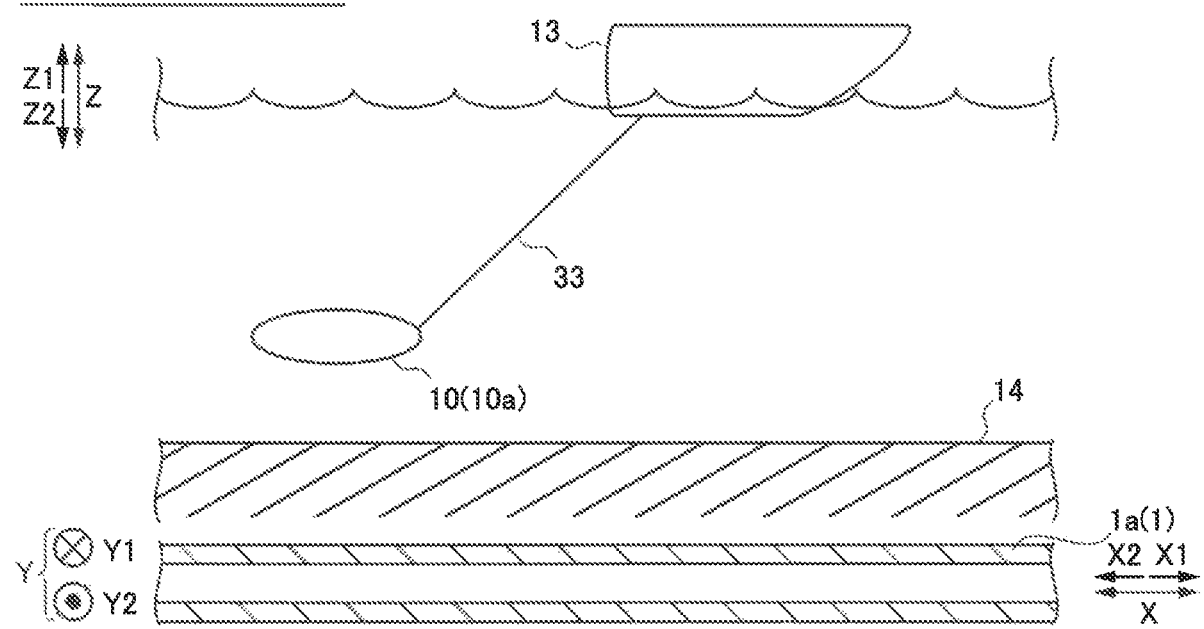
FIG. 19 is a schematic view showing the subsea structure detection device according to the second embodiment that is detecting a pipeline provided on the seabed.

As shown in FIG. 19, the subsea structure detection system 200 according to the second embodiment is configured to detect the pipeline 1a provided on the seabed 14 by towing the detection device 300 by the marine vessel 13.

The detection device 300 is towed by the marine vessel 13. Therefore, unlike the subsea structure detection device 100 according to the first embodiment, it is not necessary to provide a propulsion mechanism 6 in the detection device 300. Furthermore, the control device 400 determines the position of the pipeline 1a, and thus the detection device 300 may not include the controller 4. That is, the detection device 300 only needs to include the plurality of supply electrode pairs 2 and the plurality of potential difference detectors 3.

The remaining configurations of the second embodiment are similar to those of the first embodiment.

Advantages of Second Embodiment

According to the second embodiment, the following advantages are obtained.

According to the second embodiment, as described above, the subsea structure detection system 200 is configured to detect the structure 1 (pipeline 1a) provided on the seabed 14, and includes the detection device 300 including the plurality of supply electrode pairs 2 each including the positive electrode 2a and the negative electrode 2b and the plurality of potential difference detectors 3 each arranged between each positive electrode 2a and each negative electrode 2b and configured to detect the potential difference between the positive electrode 2a and the negative electrode 2b due to a current supplied between the positive electrode 2a and the negative electrode 2b, the current source 5 configured to supply a current between the supply electrode pairs 2, and the control device 400 configured to perform control to determine the position of the pipeline 1a based on the changes in the detection signals 11 detected by the plurality of potential difference detectors 3 caused by the pipeline 1a. Accordingly, similarly to the subsea structure detection device 100 according to the first embodiment, it is possible to provide the subsea structure detection system 200 configured to be able to detect the position of the pipeline 1a provided on the seabed 14 even when the magnitude of the magnetism emitted from the pipeline 1a provided on the seabed 14 is small due to a material for the pipeline 1a provided on the seabed 14.

According to the second embodiment, as described above, the control device 400 is provided in the marine vessel 13 that travels on the sea surface. Accordingly, in the control device 400 provided in the marine vessel 13, determination of the position of the pipeline 1a can be performed, and thus the configuration of the detection device 300 can be simplified.

The remaining advantages of the second embodiment are similar to those of the first embodiment.

Modified Examples

The embodiments disclosed this time must be considered as illustrative in all points and not restrictive. The scope of the present invention is not shown by the above description of the embodiments but by the scope of claims for patent, and all modifications (modified examples) within the meaning and scope equivalent to the scope of claims for patent are further included.

Figure 20:
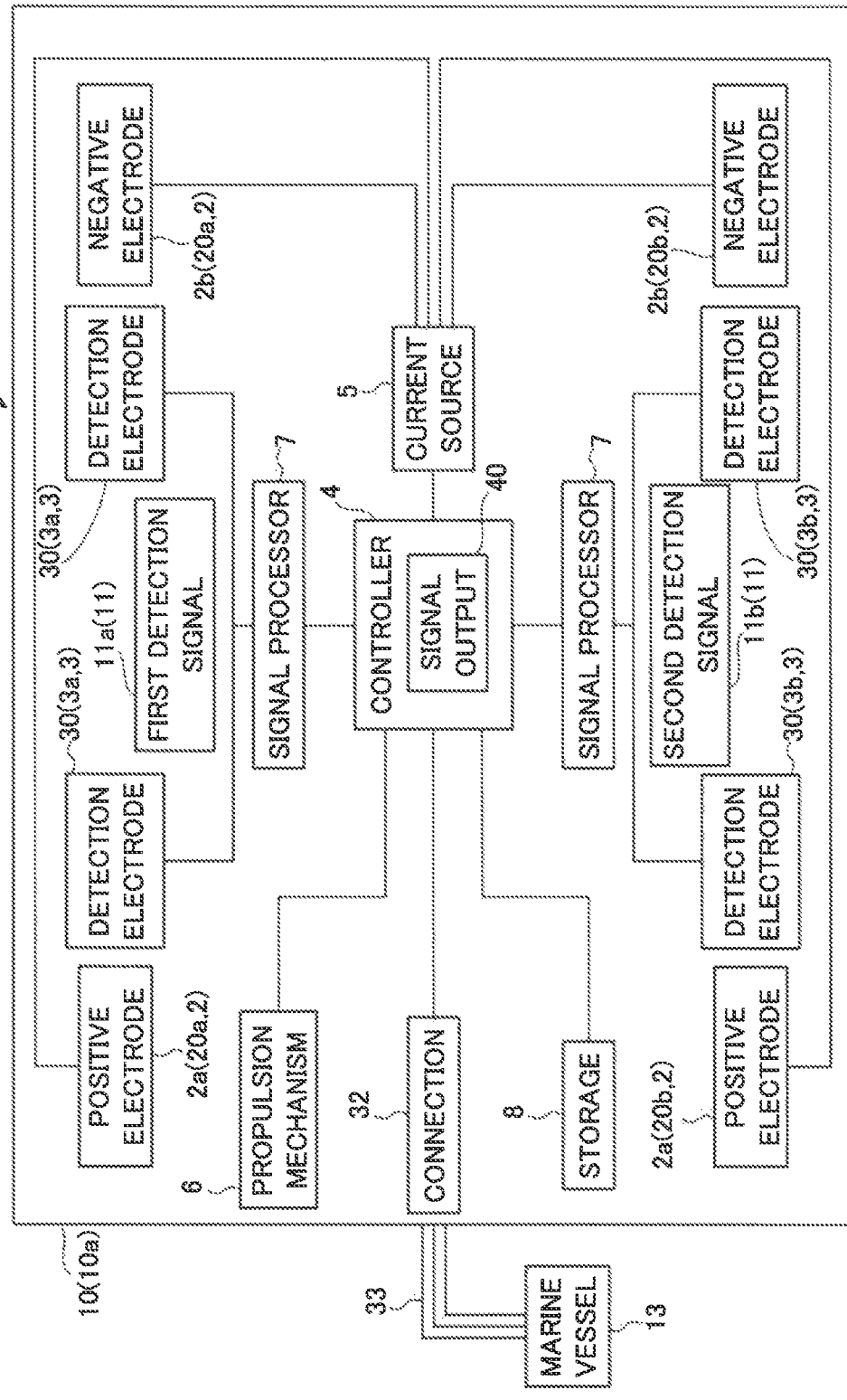
FIG. 20 is a block diagram showing the overall configuration of a subsea structure detection device according to a modified example of the first embodiment.

For example, while the subsea structure detection device 100 includes the communicator 9 and is wirelessly connected to the marine vessel 13 in the aforementioned first embodiment, the present invention is not limited to this. For example, as in a modified example shown in FIG. 20, the subsea structure detection device 100 may alternatively include a connection 32 and be connected to the marine vessel 13 via a cable 33 by wire. That is, as shown in FIG. 21, the subsea structure detection device 100 (moving body 10) and the marine vessel 13 may be connected to each other by the cable 33, and the marine vessel 13 and the subsea structure detection device 100 may be configured to communicate with each other by wire. In the modified example shown in FIG. 21, the subsea structure detection device 100 may be configured to travel autonomously, or a user who is on the marine vessel 13 may operate the subsea structure detection device 100 via the cable 33.

While the potential difference detectors 3 each include the silver-silver chloride electrode in each of the aforementioned first and second embodiments, the present invention is not limited to this. For example, the potential difference detectors 3 each may include a palladium-hydrogen electrode. As long as the potential difference between the supply electrode pair 2 can be detected, the potential difference detectors 3 may be configured in any manner.

While the potential difference detectors 3 include the first potential difference detector 3a, the second potential difference detector 3b, and the third potential difference detector 3c in each of the aforementioned first and second embodiments, the present invention is not limited to this. For example, the potential difference detectors 3 may not include the third potential difference detector 3c as long as the same include the first potential difference detector 3a and the second potential difference detector 3b. However, when the third potential difference detector 3c is not included, the accuracy of determining the position of the pipeline 1a is reduced when the pipeline 1a is located directly below the subsea structure detection device 100, and thus the third potential difference detector 3c is preferably included.

While the plurality of supply electrode pairs 2 and the plurality of potential difference detectors 3 are respectively arranged in such a manner that the distances 17 from the bottom 16 of the moving body 10 are substantially equal in each of the aforementioned first and second embodiments, the present invention is not limited to this. As long as the plurality of potential difference detectors 3 are respectively arranged in such a manner that the distances 17 from the bottom 16 of the moving body 10 are substantially equal to each other, the plurality of supply electrode pairs 2 may be provided at different positions in the upward-downward direction.

While the position of the pipeline 1a is determined by comparing the magnitudes of the detection signals 11 detected by the potential difference detectors 3 in each of the aforementioned first and second embodiments, the present invention is not limited to this. For example, the position of the pipeline 1a may be determined by acquiring a change in the detection signal 11 detected by each potential difference detector 3 over time and determining whether or not the value of the detection signal 11 detected this time is larger than the value of the previous detection signal 11.

While the current source 5 supplies currents of different frequencies to the first electrode pair 20a and the second electrode pair 20b at the same timing in each of the aforementioned first and second embodiments, the present invention is not limited to this. For example, the current source 5 may alternatively be configured to supply currents of the same frequency to the first electrode pair 20a and the second electrode pair 20b at different timings.

While the signals for adjusting the moving direction of the moving body 10 output by the signal output 40 are "1", "0", and "−1" in each of the aforementioned first and second embodiments, the present invention is not limited to this. For example, the signal output 40 may alternatively be configured to output a signal that is a ternary signal of right, left, and no change (the direction is not changed) and that indicates the strength of the direction (closeness from the pipeline 1a) according to the signal strength.

While the control processing of the controller 4 is described using a flowchart in a flow-driven manner in which the processing is performed in order along a processing flow for the convenience of illustration in the aforementioned first embodiment, the present invention is not limited to this. In the present invention, the control processing of the controller 4 may alternatively be performed in an event-driven manner in which the processing is performed on an event basis. In this case, the control processing may be performed in a complete event-driven manner or in a combination of an event-driven manner and a flow-driven manner.

What is claimed is:

1. A subsea structure detection device configured to detect a structure provided on a seabed, the subsea structure detection device comprising:
    a plurality of supply electrode pairs each including a positive electrode and a negative electrode;
    a plurality of potential difference detectors each arranged between the positive electrode and the negative electrode in each of the plurality of supply electrode pairs and configured to detect a potential difference in a detection region between the positive electrode and the negative electrode due to a current supplied between the positive electrode and the negative electrode; and
    a controller configured to perform control to determine a position of the structure based on changes in detection signals detected by the plurality of potential difference detectors caused by the structure,
    wherein among the plurality of pair of supple electrode pairs and the plurality of potential difference detectors, at least two pairs of supply electrode pairs and the plurality of potential difference detectors are arranged along directions orthogonal to each other.

2. The subsea structure detection device according to claim 1, further comprising a moving body including at least the plurality of supply electrode pairs and the plurality of potential difference detectors and configured to be movable in water; wherein
    the controller is configured to perform control to output a signal to adjust a moving direction of the moving body based on a determination result of the position of the structure and the detection signals.

3. The subsea structure detection device according to claim 2, wherein
    the plurality of potential difference detectors each include a detection electrode pair spaced apart from each other in a direction along a traveling direction of the moving body in the moving body, and are configured to detect a potential difference between the detection electrode pair; and
    the controller is configured to perform control to determine the position of the structure based on a change in the potential difference between the detection electrode pair.

4. The subsea structure detection device according to claim 3, wherein
    the plurality of potential difference detectors include at least a first potential difference detector provided on a first side among left-right sides of the moving body in a direction along the traveling direction of the moving body, and a second potential difference detector provided on a second side different from the first side among the left-right sides; and
    the controller is configured to perform control to determine the position of the structure in a left-right direction with respect to the traveling direction of the moving body based on a first detection signal detected by the first potential difference detector and a second detection signal detected by the second potential difference detector.

5. The subsea structure detection device according to claim 4, wherein
    the plurality of supply electrode pairs include a first electrode pair spaced apart from each other in the direction along the traveling direction on the first side and a second electrode pair spaced apart from each other in the direction along the traveling direction on the second side; and
    currents of different frequencies are respectively supplied to the first electrode pair and the second electrode pair.

6. The subsea structure detection device according to claim 5, wherein the controller is configured to perform control to determine the position of the structure with respect to the moving body by Fourier transforming the detection signals and analyzing a Fourier transformed detection signal for each of the frequencies of the currents respectively supplied to the first electrode pair and the second electrode pair.

7. The subsea structure detection device according to claim 4, wherein the plurality of potential difference detectors further include a third potential difference detector including the detection electrode pair aligned in the left-right direction with respect to the traveling direction in the moving body.

8. The subsea structure detection device according to claim 4, wherein the plurality of potential difference detectors are provided at a side or a bottom side of the moving body in such a manner that distances in an upward-downward direction from a bottom of the moving body are substantially equal to each other.

9. The subsea structure detection device according to claim 2, wherein the moving body includes the plurality of supply electrode pairs, the plurality of potential difference detectors, a current source configured to supply a current between the plurality of supply electrode pairs, the controller, and a propulsion mechanism configured to apply a propulsive force to the moving body, and is configured to autonomously travel in a sea.

10. The subsea structure detection device according to claim 1, wherein
the structure is a pipeline provided on the seabed; and
the controller is configured to determine a position of the pipeline.

11. The subsea detection device according to claim 3, wherein:
the plurality of potential difference detectors include a first potential difference detector including the detection electrode pair aligned in a direction along the traveling direction of the moving body, or a second potential difference detector aligned along the,
orthogonal direction with respect to the traveling direction in the moving body.

12. The subsea structure detection device according to claim 2, wherein the controller is further configured to control a change of the traveling direction of the moving body is changed in response to a change in the potential difference between the detection electrode pair.

13. The subsea structure detection device according to claim 12, wherein a series of changes to the traveling direction of the moving body allows the moving body to follow the structure provided on the seabed.

14. The subsea structure detection device according to claim 5, wherein the currents of different frequencies are different from each other by several tens of Hz.

15. The subsea structure detection device according to claim 3, wherein at least 3 supply electrode pairs and at least 3 potential difference electrode pairs are provided.

16. The subsea structure detection device according to claim 1, wherein at least one of the pair of supply electrodes is parallel to another pair of supply electrodes.

17. The subsea structure detection device according to claim 3, wherein a plurality of potential difference electrode pairs are provided where a pair of potential difference electrodes is not parallel to another pair of potential difference electrodes.

18. A subsea structure detection system configured to detect a structure provided on a seabed, the subsea structure detection system comprising:

a detection device including a plurality of supply electrode pairs each including a positive electrode and a negative electrode and a plurality of potential difference detectors each arranged between the positive electrode and the negative electrode in each of the plurality of supply electrode pairs and configured to detect a potential difference in a detection region between the positive electrode and the negative electrode due to a current supplied between the positive electrode and the negative electrode;
a current source configured to supply a current between the plurality of supply electrode pairs; and
a control device configured to perform control to determine a position of the structure based on changes in detection signals detected by the plurality of potential difference detectors caused by the structure,
wherein among the plurality of pair of supply electrode pairs and the plurality of potential difference detectors, at least two pairs of supply electrode pairs and the plurality of potential difference detectors are arranged along directions orthogonal to each other.

19. The subsea structure detection system according to claim 18, wherein the control device is provided in a marine vessel configured to travel on a sea surface.

20. A subsea structure detection method for detecting a structure provided on a seabed, the subsea structure detection method comprising:
moving, along the seabed, a moving body including at least a plurality of supply electrode pairs including a positive electrode and a negative electrode and a plurality of potential difference detectors;
supplying a current between the positive electrode and the negative electrode;
detecting a potential difference in a detection region between the positive electrode and the negative electrode; and
performing control to determine a position of the structure based on a change in a detected detection signal caused by the structure,
wherein the plurality of the potential difference detectors are respectively arranged between the positive electrode and the negative electrode in each of the plurality of supply electrode pairs, and
wherein among the plurality of pair of supply electrode pairs and the plurality of potential difference detectors, at least two pairs of supply electrode pairs and the plurality of potential difference detectors are arranged along directions orthogonal to each other.

* * * * *